(12) United States Patent
Sueda

(10) Patent No.: US 9,501,428 B2
(45) Date of Patent: Nov. 22, 2016

(54) MANAGING APPARATUS

(71) Applicant: FUJITSU LIMITED, Kawasaki-shi, Kanagawa (JP)

(72) Inventor: Naoya Sueda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 67 days.

(21) Appl. No.: 14/306,292

(22) Filed: Jun. 17, 2014

(65) Prior Publication Data

US 2014/0297977 A1    Oct. 2, 2014

Related U.S. Application Data

(63) Continuation of application No. PCT/JP2011/079741, filed on Dec. 21, 2011.

(51) Int. Cl.
| | | |
|---|---|---|
| *G06F 12/00* | (2006.01) | |
| *G06F 12/12* | (2016.01) | |
| *G06F 3/06* | (2006.01) | |
| *G06F 13/16* | (2006.01) | |

(52) U.S. Cl.
CPC ............ *G06F 12/122* (2013.01); *G06F 3/061* (2013.01); *G06F 3/067* (2013.01); *G06F 3/0659* (2013.01); *G06F 13/1689* (2013.01)

(58) Field of Classification Search
None
See application file for complete search history.

(56) References Cited

U.S. PATENT DOCUMENTS

| | | | |
|---|---|---|---|
| 6,636,951 B1 | 10/2003 | Tachikawa | |
| 6,912,635 B2 | 6/2005 | Patterson et al. | |
| 8,271,737 B2 * | 9/2012 | Chen | G06F 12/0804 711/118 |
| 2002/0157092 A1 | 10/2002 | Kitsukawa et al. | |
| 2003/0140207 A1 | 7/2003 | Nagase et al. | |
| 2006/0031648 A1 | 2/2006 | Ishikawa et al. | |
| 2010/0299541 A1 * | 11/2010 | Ishikawa | G06F 1/3228 713/300 |
| 2011/0010514 A1 * | 1/2011 | Benhase | G06F 3/061 711/162 |
| 2011/0276964 A1 | 11/2011 | Ogawa et al. | |
| 2012/0042122 A1 * | 2/2012 | Beniyama | G06F 3/0608 711/112 |
| 2012/0096289 A1 * | 4/2012 | Kawakami | G06F 1/3221 713/320 |

FOREIGN PATENT DOCUMENTS

| | | |
|---|---|---|
| JP | 07-056691 | 3/1995 |
| JP | 2000-163288 | 6/2000 |
| JP | 2001-318902 A | 11/2001 |
| JP | 2003-216460 | 7/2003 |
| JP | 2004-005634 | 1/2004 |
| JP | 2004-78999 | 3/2004 |

(Continued)

OTHER PUBLICATIONS

International Search Report, mailed in connection with PCT/JP2011/079741 and mailed Apr. 3, 2012.

(Continued)

*Primary Examiner* — Brian Peugh
(74) *Attorney, Agent, or Firm* — Fujitsu Patent Center

(57) ABSTRACT

A managing server includes a predicting unit and a controlling unit. The predicting unit predicts either a time or a time period at which frequency of accesses from a plurality of apparatuses to a storage device storing data therein will exceed a predetermined threshold value, on a basis of a status of the accesses from the plurality of apparatuses to the storage device. The controlling unit controls the storage device so as to transmit the data stored therein to at least one of the plurality of apparatuses, prior to the predicted time or time period.

5 Claims, 16 Drawing Sheets

(56) References Cited

FOREIGN PATENT DOCUMENTS

| JP | 2004-537880 A | 12/2004 |
|---|---|---|
| JP | 2005-10970 A | 1/2005 |
| JP | 2006-053601 | 2/2006 |
| JP | 2008-72484 A | 3/2008 |
| JP | 2011-076469 | 4/2011 |
| WO | 02/087239 A | 10/2002 |
| WO | 2010/079772 | 7/2010 |

OTHER PUBLICATIONS

Japanese Office Action mailed Apr. 14, 2015 for corresponding Japanese Patent Application No. 2013-550021, with Partial English Translation, 4 pages.

* cited by examiner

FIG.2

| ACCESS OFFSET | ACCESS COUNT | LAST ACCESS TIME |
|---|---|---|
| 0 M | 16 | 1298464728 |
| 1 M | 32 | 1298464730 |
| 2 M | 37 | 1298464828 |
| 3 M | 24 | 1298461212 |
| ... | ... | ... |
| 128 M | 0 | Null |
| ... | ... | ... |
| 256 M | 3 | 1298412543 |
| ... | ... | ... |

FIG.3

|  | 00:00-01:00 | 01:00-02:00 | ... | 08:00-09:00 | ... | 23:00-24:00 |
|---|---|---|---|---|---|---|
| 0 M | 45 | 23 | ... | 3569 | ... | 65 |
| 32 M | 21 | 10 | ... | 2312 | ... | 43 |
| 64 M | 29 | 8 | ... | 2400 | ... | 33 |
| 96 M | 24 | 10 | ... | 685 | ... | 24 |
| 128 M | 35 | 12 | ... | 234 | ... | 31 |
| 160 M | 0 | 2 | ... | 212 | ... | 2 |
| ... | ... | ... | ... | ... | ... | ... |

FIG.4

|  | Mon 08:00-09:00 | Tue 08:00-09:00 | ... | Fri 08:00-09:00 | Sat 08:00-09:00 | Sun 08:00-09:00 |
|---|---|---|---|---|---|---|
| 0 M | 445 | 469 | ... | 451 | 23 | 21 |
| 1 M | 244 | 288 | ... | 289 | 19 | 14 |
| ... | ... | ... | ... | ... | ... | ... |
| 16 M | 95 | 101 | ... | 94 | 21 | 17 |
| ... | ... | ... | ... | ... | ... | ... |
| 159 M | 9 | 12 | ... | 7 | 4 | 3 |

FIG.5

| 08:00-09:00 | 0 M-1 M | Mon | 192.168.xx.1 192.168.xx.2 192.168.xx.7 ... |
|---|---|---|---|
| 08:00-09:00 | 1 M-2 M | Mon | 192.168.xx.1 192.168.xx.2 ... |
| ... | ... | ... | ... |

FIG.6

| 08:00-09:00 | 0 M-15 M | Mon, Tue, Wed, Thu, Fri | 192.168.xx.1 192.168.xx.2 192.168.xx.7··· |
|---|---|---|---|
| 08:00-09:00 | 32 M-38 M | Mon, Tue, Fri | 192.168.xx.1 192.168.xx.5··· |
| ... | ... | ... | ... |

FIG.7A

| OFFSET /64 MB | ACCESS FREQUENCY |
|---|---|
| 0 | 4023 |
| 4 | 2034 |
| 8 | 1239 |
| 12 | 323 |
| 16 | 119 |
| 20 | 23 |
| 24 | 12 |
| 28 | 30 |
| 32 | 41 |
| 36 | 85 |
| 40 | 21 |
| 44 | 91 |
| 48 | 31 |
| 52 | 32 |
| 56 | 98 |
| 60 | 28 |

FIG.7B

| OFFSET /128 MB | ACCESS FREQUENCY |
|---|---|
| 0 | 3012 |
| 8 | 391 |
| 16 | 48 |
| 24 | 31 |
| 32 | 69 |
| 40 | 21 |
| 48 | 23 |
| 56 | 41 |
| 64 | 981 |
| 72 | 199 |
| 80 | 21 |
| 88 | 28 |
| 96 | 12 |
| 104 | 16 |
| 112 | 8 |
| 120 | 11 |

MANAGING APPARATUS

CROSS-REFERENCE TO RELATED APPLICATION(S)

This application is a continuation of International Application No. PCT/JP2011/079741, filed on Dec. 21, 2011, the entire contents of which are incorporated herein by reference.

FIELD

The embodiments discussed herein are related to a managing apparatus.

BACKGROUND

Conventionally, systems in which a plurality of apparatuses share a disk storing therein an Operating System (OS) program, application programs, and the like are known. In such a system, the plurality of apparatuses access the disk to use the OS program and the application programs.

Further, another system is also known in which, if one or more of a plurality of apparatuses access a first disk with access frequency that exceeds a threshold value, control is exercised so that the entirety of the storage contents of the first disk is copied onto the second disk and so that the one or more apparatuses of which the frequency of accesses to the first disk exceeds the threshold value are arranged to access the second disk. For example, refer to Japanese Laid-open Patent Publication No. 2004-78999, Japanese Laid-open Patent Publication No. 2004-005634, and Japanese Laid-open Patent Publication No. 07-056691.

According to the conventional technique described above, however, a problem remains where the Input/Output (I/O) load on the first disk is still large.

For example, in the system described above, the entirety of the storage contents of the first disk is copied onto the second disk, after the frequency of accesses to the first disk has exceeded the threshold value. In other words, the control to reduce the access load is exercised after the access load on the first disk has exceeded the predetermined level of load. Thus, in the system described above, the I/O load on the first disk is large before the control to reduce the access load is exercised.

Further, in the system described above, because the entirety of the storage contents of the first disk is copied onto the second disk, after the access load on the first disk has already become large, the I/O load on the first disk becomes even larger from the copying.

The same problem is also observed in the system in which a plurality of apparatuses access a shared volume storing therein an OS program, application programs, and the like. In other words, the problem is observed where the I/O load on the shared volume is large, because the plurality of apparatuses access the shared volume.

SUMMARY

According to an aspect of an embodiment, a managing apparatus includes a predicting unit and a controlling unit. The predicting unit predicts either a time or a time period at which frequency of accesses from a plurality of apparatuses to a storage device storing data therein will exceed a predetermined threshold value, on a basis of a status of the accesses from the plurality of apparatuses to the storage device. The controlling unit controls the storage device so as to transmit the data stored therein to at least one of the plurality of apparatuses, prior to the predicted time or time period.

According to another aspect of an embodiment, a managing apparatus includes a predicting unit and a controlling unit. The predicting unit identifies a plurality of storage areas of a storage device storing data therein to which frequency of accesses from a plurality of apparatuses exceeds a predetermined threshold value and of which addresses exhibit predetermined periodicity, on a basis of a status of the accesses from the plurality of apparatuses to the storage device. The controlling unit controls the storage device so as to transmit data stored in the plurality of storage areas identified by the predicting unit to at least one of the plurality of apparatuses.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a drawing of an exemplary data structure of a first table;

FIG. 3 is a drawing of an exemplary data structure of a second table;

FIG. 4 is a drawing of an exemplary data structure of a fourth table;

FIG. 5 is a drawing of an exemplary data structure of a fifth table;

FIG. 6 is a drawing of an exemplary data structure of a sixth table;

FIG. 7A is a drawing of an exemplary data structure of a seventh table;

FIG. 7B is a drawing of another exemplary data structure of the seventh table;

DESCRIPTION OF EMBODIMENT(S)

Preferred embodiments of the present invention will be explained with reference to accompanying drawings. The present disclosure is not limited by the exemplary embodiments. Any of the exemplary embodiments may be carried out in combination as appropriate, as long as the combination does not cause any contradiction in the details of the processing.

Exemplary Configuration of System 1

Figure 1:
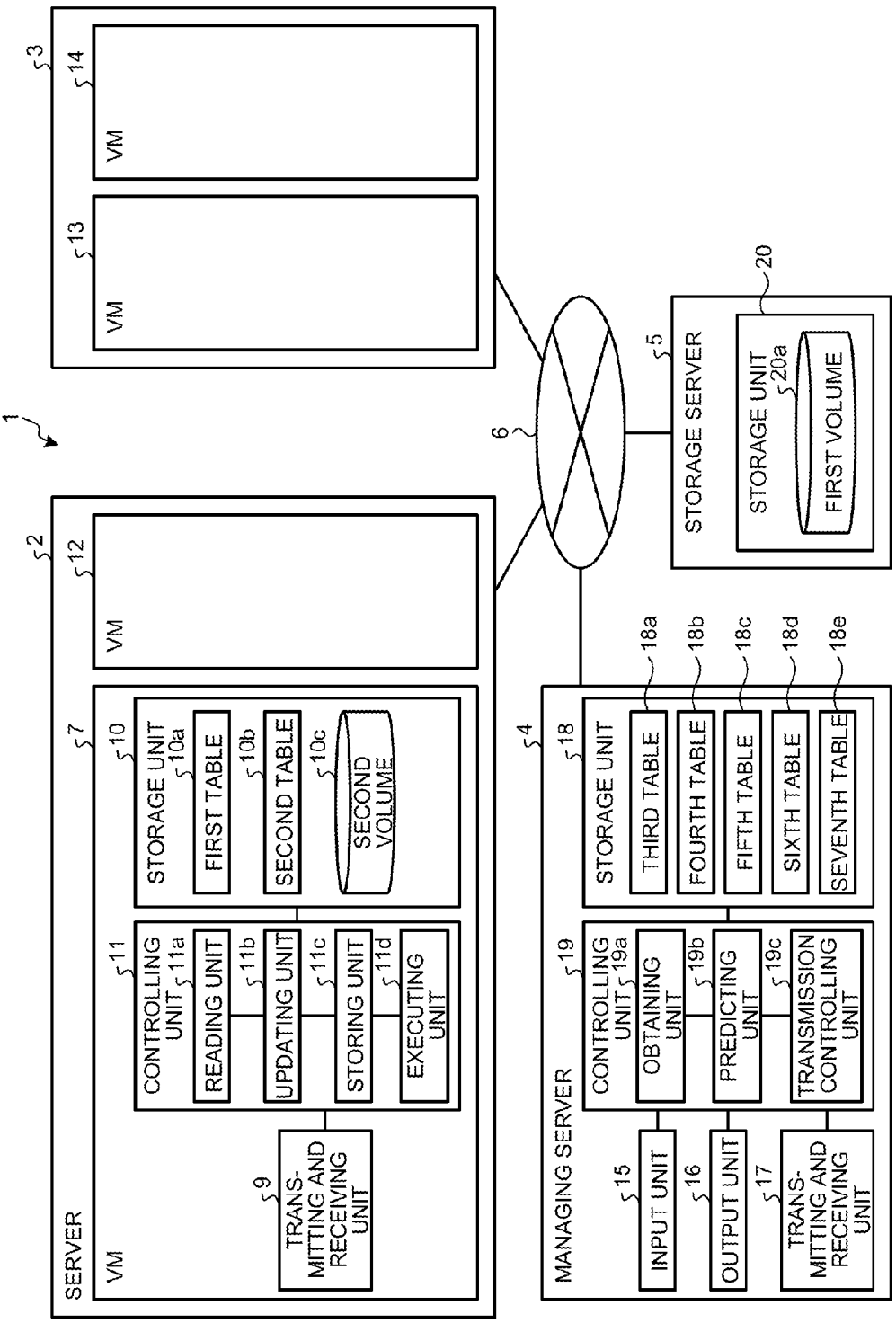
FIG. 1 is a diagram of an exemplary configuration of a system according to an embodiment.

A system according to an exemplary embodiment will be explained. FIG. 1 is a diagram of an exemplary configuration of a system according to the present embodiment. A system 1 according to the present embodiment includes a server 2, a server 3, a managing server 4, and a storage server 5. The server 2, the server 3, the managing server 4, and the storage server 5 are connected together so as to enable data transmissions and receptions therebetween. In the example illustrated in FIG. 1, the server 2, the server 3, the managing server 4, and the storage server 5 are connected to one another via an Internet 6. The server 2, the server 3, the managing server 4, and the storage server 5 may be connected to one another wirelessly. FIG. 1 illustrates an example in which the number of servers is two, the number of managing servers is one, and the number of storage servers is one. However, the number of servers may be one or may be three or more. The number of managing servers may be two or more. Also, the number of storage servers may be two or more. The managing server 4 is an example of the managing apparatus.

The server 2 is configured to put a virtual machine (VM) 7 and a VM 12 into operation. For example, the server 2 puts the VM 7 into operation, the VM 7 being assigned to a development department, which is a department of a corporate. Also, the server 2 puts the VM 12 into operation, the VM 12 being assigned to a general affairs department, which is another department of the same corporate. The VM 7 and the VM 12 each operate in accordance with the assigned department. Further, although the number of VMs that are put into operation by the server 2 is two in the present example, the number of VMs put into operation by the server 2 is not limited to this example and may be any arbitrary natural number.

The VM 7 includes a transmitting and receiving unit 9, a storage unit 10, and a controlling unit 11.

The transmitting and receiving unit 9 is a communication interface for performing communication with the VM 12, a VM 13, a VM 14, the managing server 4, and the storage server 5.

The storage unit 10 stores various types of information therein. For example, the storage unit 10 stores therein a first table 10a, a second table 10b, and a second volume 10c.

The first table 10a has registered therein, for each of offsets indicating positions from the head of a storage area of a first volume 20a (explained later), the number of times a reading unit 11a (explained later) has made an access thereto (hereinafter, an "access count") and a time at which the access was made. The "offsets" may be referred to as "addresses". FIG. 2 is a drawing of an exemplary data structure of the first table 10a. In the example illustrated in FIG. 2, the first table 10a has items "access offset", "access count", and "last access time". In the example illustrated in FIG. 2, the offsets in the first volume 20a are registered under the item "access offset". Further, in the example illustrated in FIG. 2, the number of times the reading unit 11a has made an access is updated by an updating unit 11b (explained later) under the item "access count". Furthermore, in the example illustrated in FIG. 2, the number of seconds from a predetermined date and time to the time at which the reading unit 11a made the most recent access is updated by the updating unit 11b (explained later), under the item "last access time". The example in FIG. 2 illustrates that the storage area indicated by an offset "0 M (Megabytes)" in the first volume 20a has been accessed sixteen times. Further, the example in FIG. 2 illustrates that the number of seconds from the predetermined date and time to the time at which the reading unit 11a made the most recent access to the storage area indicated by the offset "0 M" in the first volume 20a is "1298464728".

Into the second table 10b, for each of first offset ranges in the first volume 20a and each of time periods in which accesses were made, the updating unit 11b (explained later) registers the number of times the reading unit 11a (explained later) has accessed the storage area indicated by the first offset range. FIG. 3 is a drawing of an exemplary data structure of the second table 10b. The example in FIG. 3 illustrates a situation where the "first offset ranges" are arranged in units of "32 M", whereas the "time periods" are arranged in units of "one hour". The example in FIG. 3 illustrates a situation where the number of times (i.e., the access count) the reading unit 11a accessed the storage area corresponding to the range from 0 M to less than 32 M during the time period from 8 o'clock to 9 o'clock is 3569.

Into the second volume 10c, a storing unit 11c (explained later) stores update data of an Operating System (OS) program stored in the first volume 20a. Further, into the second volume 10c, the storing unit 11c stores data transmitted from the managing server 4. These pieces of data are the data stored in a storage area of which the frequency of accesses (hereinafter, "access frequency") is predicted to exceed a predetermined threshold value, i.e., a storage area predicted to have high access frequency. In the present embodiment, because the second volume 10c stores such pieces of data therein, before the input/output (I/O) load of the first volume 20a becomes large, it is possible to reduce the I/O load.

For example, the storage unit 10 is a storage device such as a semiconductor memory element (e.g., a flash memory), a hard disk, or an optical disk. The storage unit 10 does not necessarily have to be a storage device of the abovementioned types and may be configured with a Random Access Memory (RAM) or a Read-Only Memory (ROM).

The controlling unit 11 has an internal memory used for storing therein programs defining various types of processing procedures and control data and is configured to perform various types of processing by using the stored programs and data. As illustrated in FIG. 1, the controlling unit 11 includes the reading unit 11a, the updating unit 11b, the storing unit 11c, and an executing unit 11d.

The reading unit 11a is configured to access data when executing the OS program or an application program, for example. For example, the reading unit 11a refers to a table (not depicted) indicating arranged locations of data and judges whether access target data is present in the first volume 20a or the second volume 10c. What is stored in the table (hereinafter, "contents of the table") is updated by the updating unit 11b (explained later). For example, when the storing unit 11c has stored data into the second volume 10c, information indicating that the data is stored in the second volume 10c is registered into the table. As another example, when the storing unit 11c has deleted data from the second volume 10c and if the data is stored in the first volume 20a, information indicating that the data is stored in the first volume 20a is registered into the table. Further, the reading unit 11a reads data by accessing the volume in which the data is present and searching for the data. In addition, every time the reading unit 11a accesses the first volume 20a, the reading unit 11a transmits, to the managing server 4, the offset in the first volume 20a to which the access was made and the access time.

Every time the reading unit 11a accesses the first volume 20a and the second volume 10c, the updating unit 11b updates the access count and the access time stored in corresponding sections of the first table 10a. Further, every time the reading unit 11a accesses the first volume 20a, the updating unit 11b updates the access count in a corresponding section of the second table 10b.

Further, when the storing unit 11c has stored data in the second volume 10c, the updating unit 11b registers information indicating that the data is stored in the second volume 10c into the abovementioned table indicating arranged locations of data. Further, when the storing unit 11c has deleted data from the second volume 10c and if the data is stored in the first volume 20a, the updating unit 11b registers information indicating that the data is stored in the first volume 20a into the table. Further, when having received an update fact (explained later), the updating unit 11b initializes corresponding sections of the first table 10a and the second table 10b.

The storing unit 11c is configured to store various types of information. Specific examples will be explained below. When having received data transferred from the managing server 4 via the transmitting and receiving unit 9, the storing unit 11c stores the received data into the second volume 10c. After that, the storing unit 11c judges whether a transfer instruction for the received data is present or not. If a transfer instruction is present, the storing unit 11c transfers the data to one or more VMs designated by the transfer instruction.

Further, when having received an update fact, the storing unit 11c stores update data of the OS program stored in the first volume 20a into the second volume 10c so as to update the second volume.

Further, when the reading unit 11a has accessed the first volume 20a, the storing unit 11c identifies the offset in the first volume 20a accessed by the reading unit 11a. After that, the storing unit 11c obtains the access count of the storage area indicated by the identified offset, from the first table 10a. Subsequently, the storing unit 11c judges whether the obtained access count is equal to or higher than a predetermined threshold value P. In this situation, in one example, the predetermined threshold value P may be the smallest value among access counts of the storage server 5 from the VMs in such situations where the usage rate of the Internet 6 is equal to or higher than a predetermined value. If the access count is equal to or higher than the predetermined threshold value P, the storing unit 11c stores the data read by the reading unit 11a into a cache. Subsequently, the storing unit 11c stores the data stored in the cache into the second volume 10c. After that, the storing unit 11c initializes a section of the first table 10a corresponding to the data stored in the second volume 10c, i.e., sets the section to 0. On the contrary, if the access count is lower than the predetermined threshold value P, the storing unit 11c stores the data read by the reading unit 11a into the cache, but does not store the data into the second volume 10c.

As explained above, each of the VMs according to the present embodiment is configured to store data having high read frequency (i.e., high access frequency) into the second volume 10c. Thus, it is possible to suppress accesses to the first volume 20a and to reduce the I/O loads.

Further, from the second table 10b, the storing unit 11c obtains, once every predetermined length of time, all the access counts, for each of the time periods for each of the offsets. In this situation, the access count for each of the time periods may be referred to as "access frequency". Subsequently, the storing unit 11c judges whether there is any offset of which the access frequency has not exceeded the threshold value P for a predetermined length of time, among the obtained access frequency values of the offsets. If there are one or more offsets of which the access frequency has not exceeded the threshold value P for the predetermined length of time, the storing unit 11c deletes the data at such offsets from the second volume 10c.

The storing unit 11c calculates, once every predetermined length of time, a usage amount of the second volume 10c, by dividing the total size of all the pieces of data stored in the second volume 10c by the storage capacity of the second volume 10c. After that, the storing unit 11c judges whether the usage amount is equal to or larger than a threshold value Q. If the usage amount is equal to or larger than the threshold value Q, because the capacity of the second volume 10c available for storage is small, the storing unit 11c deletes the oldest data from the second volume 10c. After that, the storing unit 11c calculates a usage amount again. The storing unit 11c repeatedly performs the process of deleting the oldest data in the second volume 10c until the calculated usage amount becomes smaller than the threshold value Q.

As explained above, because each of the VMs according to the present embodiment is configured so as to delete the data having low access frequency from the second volume 10c, it is possible to suppress the data amount of the second volume 10c.

The executing unit 11d is configured to perform a snapshot process. As a result, the update data of the OS program stored in the first volume 20a will be stored in the second volume 10c.

The controlling unit 11 includes an integrated circuit such as an Application Specific Integrated Circuit (ASIC) or a Field Programmable Gate Array (FPGA). The controlling unit 11 may include an electronic circuit such as a Central Processing Unit (CPU) or a Micro Processing Unit (MPU).

Because the configuration of the VM 12 is the same as the configuration of the VM 7, the explanation thereof will be omitted.

The server 3 puts the VM 13 and the VM 14 into operation. For example, the server 3 puts the VM 13 into operation, the VM 13 being assigned to a human resources department, which is a department of a corporate. Also, the server 3 puts the VM 14 into operation, the VM 14 being assigned to a sales department, which is another department of the same corporate. The VM 13 and the VM 14 each operate in accordance with the assigned department. Further, although the number of VMs that are put into operation by the server 3 is two in the present example, the number of VMs put into operation by the server 3 is not limited to this example and may be any arbitrary natural number. The configurations of the VM 13 and the VM 14 are the same as the configuration of the VM 7 described above. Thus, the explanation thereof will be omitted.

The managing server 4 manages the storage server 5. The managing server 4 includes an input unit 15, an output unit 16, a transmitting and receiving unit 17, a storage unit 18, and a controlling unit 19.

The input unit 15 is configured to input various types of information to the controlling unit 19. Examples of devices serving as the input unit 15 include operation receiving devices such as a mouse and a keyboard.

The output unit 16 is configured to output various types of information. Examples of devices serving as the output unit 16 include display devices such as Liquid Crystal Display (LCD) devices and Cathode Ray Tube (CRT) devices.

The transmitting and receiving unit 17 is a communication interface to perform communication with the VMs and the storage server 5. For example, when having received, from a VM, an offset in the first volume 20a to which an access was made and an access time, the transmitting and receiving unit 17 transmits the received offset and access time to the controlling unit 19.

The storage unit 18 is configured to store various types of information therein. For example, the storage unit 18 stores therein a third table 18a, a fourth table 18b, a fifth table 18c, a sixth table 18d, and a seventh table 18e.

Into the third table 18a, for each of the offsets in the first volume 20a, an obtaining unit 19a (explained later) registers the number of times the reading units of the VMs have accessed the storage area indicated by the offset and the access time. In other words, a total of the first tables stored in the plurality of VMs is presented in the third table 18a. The data structure of the third table 18a is the same as the data structure of the first table 10a illustrated in FIG. 2.

The fourth table 18b is a table that has registered therein detailed information with finer granularity about such sections of the third table 18a where the access count exceeds a predetermined threshold value. Into the fourth table 18b, for each of second offset ranges that are smaller than the first offset ranges of the first volume 20a used in the second table 10b and for each of the days of the week and each of time periods, the obtaining unit 19a (explained later) registers the number of times an access has been made by any of the reading units of the VMs. Thus, the fourth table 18b has registered therein the data that is more detailed than the data registered in the second table 10b and the third table 18a. FIG. 4 is a drawing of an exemplary data structure of the fourth table 18b. The example in FIG. 4 illustrates that the number of times the reading units of the VMs have accessed the storage area of the first volume 20a corresponding to the range of offsets (hereinafter, "offset range") from "0 M" to less than "1 M", during the time period from 8 o'clock to 9 o'clock on Friday is "451". In the example in FIG. 4, "Mon" denotes Monday. Similarly, "Tue", "Fri", "Sat", and "Sun" denote the days of the week.

Into the fifth table 18c, for each of the time periods, each of the second offset ranges of the first volume 20a, and each of the days of the week, the obtaining unit 19a (explained later) registers IP addresses of the VMs that accessed the first volume 20a. FIG. 5 is a drawing of an exemplary data structure of the fifth table 18c. The example in FIG. 5 illustrates that the IP addresses of the VMs that accessed the storage area of the first volume 20a corresponding to the offset range from "0 M" to less than "1 M" during the time period from 8 o'clock to 9 o'clock on Monday are as follows: "192.168.xx.1", "192.168.xx.2", and "192.168.xx.7". Also, the example in FIG. 5 illustrates that the IP addresses of the VMs that accessed the storage area of the first volume 20a corresponding to the offset range from "1 M" to less than "2 M" during the time period from 8 o'clock to 9 o'clock on Monday are "192.168.xx.1" and "192.168.xx.2".

Into the sixth table 18d, for each of the time periods of which the access count exceeds the threshold value and for each of third offset ranges each representing a certain range of offsets in the first volume 20a, the obtaining unit 19a (explained later) registers the IP addresses of the VMs that made an access and the days of the week on which the accesses were made. FIG. 6 is a drawing of an exemplary data structure of the sixth table. The example in FIG. 6 illustrates that the IP addresses of the VMs that accessed the storage area of the first volume 20a corresponding to the offset range from "0 M" to less than "15 M", during the time period from 8 o'clock to 9 o'clock are as follows: "192.168.xx.1", "192.168.xx.2", and "192.168.xx.7". Also, the example in FIG. 6 illustrates that the days of the week on which the VMs accessed the storage area of the first volume 20a corresponding to the offset range from "0 M" to less than "15 M" during the time period from 8 o'clock to 9 o'clock are Monday, Tuesday, Wednesday, Thursday, and Friday.

Into the seventh table 18e, the obtaining unit 19a (explained later) registers the access count for each of groups obtained by separating the offsets in the first volume 20a into a plurality of groups. FIG. 7A is a drawing of an exemplary data structure of the seventh table 18e. The example in FIG. 7A illustrates the exemplary data structure of the seventh table 18e in a situation where a remainder is calculated by dividing each of the offset values by "64 M", so that the calculated remainders are further organized into sixteen groups. The example in FIG. 7A illustrates an example in which the access count is registered for each of the ranges of offsets of 4 M from the head. The example in FIG. 7A illustrates a situation where the access count of the storage area in the range from 0 M to less than 4 M is "4023". FIG. 7B is a drawing of another exemplary data structure of the seventh table 18e. The example in FIG. 7B illustrates the exemplary data structure of the seventh table 18e in a situation where a remainder is calculated by dividing each of the offset values by "128 M", so that the calculated remainders are further organized into sixteen groups. The example in FIG. 7B illustrates an example in which the access count is registered for each of the ranges of offsets of 8 M from the head. The example in FIG. 7B illustrates a situation where the access count of the storage area in the range from 0 M to less than 8 M is "3012".

For example, the storage unit 18 is a storage device such as a semiconductor memory element (e.g., a flash memory), a hard disk, or an optical disk. The storage unit 18 does not necessarily have to be a storage device of the abovementioned types and may be configured with a Random Access Memory (RAM) or a Read-Only Memory (ROM).

The controlling unit 19 has an internal memory used for storing therein programs defining various types of processing procedures and control data and is configured to perform various types of processing by using the stored programs and data. As illustrated in FIG. 1, the controlling unit 19 includes the obtaining unit 19a, a predicting unit 19b, and a transmission controlling unit 19c.

The obtaining unit 19a is configured to obtain frequency of accesses from the plurality of VMs to the first volume 20a for each of the time periods, the first volume 20a being accessed by the plurality of VMs.

Next, specific examples will be explained. For example, the obtaining unit 19a obtains an offset and an access time, by receiving an offset in the first volume 20a and the access time at which the reading unit of a VM made an access. The obtaining unit 19a accordingly increments, by 1, the access count value in the third table 18a corresponding to the time period including the obtained access time and the storage area indicated by the obtained offset. The obtaining unit 19a updates the registered contents of the third table 18a in this manner.

Further, when the predicting unit 19b (explained later) has identified a time period and an offset range of which the access count exceeds the threshold value, the obtaining unit 19a performs the following process: The obtaining unit 19a generates the fourth table 18b for registering therein the access count, for each of the second offset ranges that are smaller than the first offset ranges, for each of the days of the week, and for each of the time periods. For example, let us discuss a situation where, in the example in FIG. 3, the predicting unit 19b (explained later) has identified the time period from 8 o'clock to 9 o'clock and the offset range from "0 M" to less than "159 M", as a time period and an offset range of which the access count exceeds the threshold value. In that situation, as illustrated in the example in FIG. 4, the obtaining unit 19a generates the fourth table 18b for registering therein the access count, for each of the days of the week and the time period from 8 o'clock to 9 o'clock, while using the second offset ranges in units of "1 M", which are smaller than the first offset ranges in units of "32 M". Further, every time the obtaining unit 19a obtains an offset and an access time, the obtaining unit 19a judges whether the obtained access time is included in the identified time period and whether the obtained offset is included in the identified offset range. Subsequently, if the obtained access time is included in the identified time period, and also, the obtained offset is included in the identified offset range, the obtaining unit 19a increments, by 1, the access count value stored in the corresponding section of the fourth table 18b. The obtaining unit 19a updates the registered contents of the fourth table 18b in this manner.

Further, for the purpose of enabling the predicting unit 19b (explained later) to judge, for each of the offset ranges, whether periodicity is observed or not in the time periods of which the access count exceeds the threshold value, the obtaining unit 19a registers data corresponding to a predetermined length of time into the fourth table 18b. For example, for the purpose of enabling the predicting unit 19b (explained later) to judge whether the time periods of which the access count exceeds the threshold value are repeated every week or not, the obtaining unit 19a registers data corresponding to at least two weeks into the fourth table 18b. However, the fourth table 18b illustrated in FIG. 4 is able to register therein data corresponding to only one week. Thus, when using the fourth table 18b illustrated in the example in FIG. 4, after registering the data corresponding to one week into the fourth table 18b, the obtaining unit 19a stores a copy of the fourth table 18b into the storage unit 18. After that, the obtaining unit 19a overwrites the fourth table 18b with the data of the following week. As a result, the storage unit 18 stores therein the data corresponding to the two weeks made up of the copy of the fourth table 18b and the fourth table 18b. Accordingly, when the predicting unit 19b performs the process of judging whether the time periods of which the access count exceeds the threshold value are repeated every week, the data corresponding to the two weeks stored in the storage unit 18 will be used.

Further, when the predicting unit 19b (explained later) has identified a time period and an offset range of which the access count exceeds the threshold value, the obtaining unit 19a performs the following process: The obtaining unit 19a generates the fifth table 18c for registering therein the IP addresses of the VMs that accessed the first volume 20a in the identified time period, for each of the second offset ranges and for each of the days of the week. For example, let us discuss a situation where, in the example illustrated in FIG. 3, the predicting unit 19b (explained later) has identified the time period from 8 o'clock to 9 o'clock and the offset range from "0 M" to less than "159 M", as a time period and an offset range of which the access count exceeds the threshold value. In that situation, as indicated in the example in FIG. 5, the obtaining unit 19a generates the fifth table 18c for registering therein the IP addresses of the VMs that have made an access in the identified time period from 8 o'clock to 9 o'clock for each of the second offset ranges in units of "1 M" and for each of the days of the week from Monday through Sunday. After that, every time the obtaining unit 19a receives an offset and an access time, the obtaining unit 19a judges whether the obtained access time is included in the identified time period and whether the obtained offset is included in the identified offset range. Subsequently, if the obtained access time is included in the identified time period, and also, the obtained offset is included in the identified offset range, the obtaining unit 19a obtains the IP address of the VM from which the offset and the access time were transmitted, out of the header of a packet. After that, the obtaining unit 19a registers the obtained IP address into the corresponding section of the fifth table 18c. The obtaining unit 19a updates the registered contents of the fifth table 18c in this manner.

If the predicting unit 19b (explained later) has determined that periodicity is observed in the time periods of which the access count exceeds the threshold value, the obtaining unit 19a performs the following process: The obtaining unit 19a generates the sixth table 18d that has registered therein the time periods determined to exhibit periodicity, the offset ranges of which the access count exceeds the threshold value, the days of the week, and the IP addresses of the VMs. For example, let us discuss a situation where, in the example in FIGS. 4 and 5, the predicting unit 19b (explained later) has determined that the access count in the time period from 8 o'clock to 9 o'clock on Monday exceeds the threshold value and that the excess is repeated every week. Let us also assume that, in that situation, the access count of the storage area in the offset range from "0 M" to less than "15 M" exceeds the threshold value. Further, let us also assume that the VMs of which the IP addresses are "192.168.xx.1", "192.168.xx.2", and "192.168.xx.7" accessed the storage area in the offset range from "0 M" to less than "15 M" in the time period from 8 o'clock to 9 o'clock on Monday. In that situation, as indicated in FIG. 6, the obtaining unit 19a registers the following information into the sixth table 18d: the time period from 8 o'clock to 9 o'clock; the offset range from "0 M" to less than "15 M"; Monday (Mon); and the IP addresses "192.168.xx.1", "192.168.xx.2", and "192.168.xx.7".

Further, when a predetermined length of time (e.g., 3 hours) has elapsed since the system 1 started operating, the obtaining unit 19a transmits an instruction to all the VMs so as to indicate that the registered contents of the first table stored in each VM is to be transmitted to the managing server 4. As a result, all the VMs each transmit the registered contents of the first table thereof to the managing server 4, so that the obtaining unit 19a obtains the registered contents of the first tables of all the VMs via the transmitting and receiving unit 17. After that, the obtaining unit 19a calculates, for each of the offsets, a sum of the access counts indicated in the obtained registered contents of the first tables of all the VMs. Thus, the obtaining unit 19a calculates the access count of the first volume 20a for each of the offset ranges in units of "1 M" in the entirety of the system 1. Subsequently, the obtaining unit 19a calculates a remainder by dividing each of the offset values by N=("64 M"). In this situation, there are 64 possibilities for the remainder such as "0 M" to "63 M". After that, the obtaining unit 19a organizes the calculated remainders into sixteen groups. For example, the obtaining unit 19a organizes the remainders "0 M" to "3 M" into Group 1, the remainders "4 M" to "7 M" into Group 2, . . . , and the remainders "60 M" to "63 M" into Group 16. After that, the obtaining unit 19a generates a seventh table 18e that has registered therein the groups and the access counts that are kept in correspondence with one another.

After that, if the predicting unit 19b (explained later) does not identify any periodicity in the registered contents of the seventh table 18e, the obtaining unit 19a doubles the value N ("64 M"×2). Subsequently, the obtaining unit 19a calculates a remainder by dividing each of the offset values by N=("128 M"). In this situation, there are 128 possibilities for the remainder such as "0 M" to "127 M". After that, the obtaining unit 19a organizes the calculated remainders into sixteen groups. For example, the obtaining unit 19a organizes the remainders "0 M" to "7 M" into Group 1, the remainders "8 M" to "15 M" into Group 2, . . . , and the remainders "120 M" to "127 M" into Group 16. After that, the obtaining unit 19a generates another seventh table 18e that has registered therein the groups and the access counts that are kept in correspondence with one another and deletes the previously-generated seventh table 18e. The obtaining unit 19a repeatedly performs the process of generating the seventh table 18e as described above, until the predicting unit 19b (explained later) identifies periodicity in the registered contents of the seventh table 18e.

On the basis of the access counts of the plurality of VMs corresponding to the time periods that are obtained by the obtaining unit 19a, the predicting unit 19b is configured to identify a time period of which the access count exceeds the threshold value, from among the time periods that are repeated in predetermined cycles. Further, on the basis of a status of the accesses from the plurality of VMs to the first volume 20a storing the data therein, the predicting unit 19b is configured to predict a time period of which the frequency of accesses from the plurality of VMs to the first volume 20a will exceed the predetermined threshold value. Next, specific examples will be explained. The predicting unit 19b obtains all the access counts for all the offset ranges and all the time periods registered in the third table 18a. From among all the access counts obtained, the predicting unit 19b identifies time periods and offset ranges of which the access count exceeds a threshold value R. Further, when having identified the time periods and the offset ranges of which the access count exceeds the threshold value R, the predicting unit 19b turns on a first flag (not depicted) stored in the storage unit 18 by setting the value thereof to a predetermined value (e.g., "1"). The initial value of first flag may have been set to "0", for example.

Further, by using the registered contents of the fourth table 18b and the copy of the fourth table 18b, the predicting unit 19b identifies, from among all the registered access counts, time periods and offset ranges of which the access count exceeds the threshold value R. After that, the predicting unit 19b judges, for each of the offset ranges, whether periodicity is observed in the time periods of which the access count exceeds the threshold value R. For example, the predicting unit 19b judges, for each of the offset ranges, whether the time periods of which the access count exceeds the threshold value R are repeated every week. If the time periods of which the access count exceeds the threshold value R are repeated every week, the predicting unit 19b determines that periodicity is observed therein.

Further, from among the registered contents of the seventh table 18e generated by the obtaining unit 19a, the predicting unit 19b identifies a plurality of offset ranges of which the access frequency exceeds a threshold value and that exhibit periodicity. For example, by referring to the registered contents of the seventh table 18e, the predicting unit 19b identifies a group of access counts exceeding a threshold value $\alpha$ as a group exhibiting periodicity, from among the groups of access counts. To explain a specific example, the predicting unit 19b judges whether there is only one group of which the access counts exceed the threshold value $\alpha$, among the groups obtained by the obtaining unit 19a by dividing each of the offset values by N. If there is only one group of which the access counts exceed the threshold value $\alpha$, the predicting unit 19b determines that periodicity is observed and identifies N to be the periodical cycle and identifies the group exceeding the threshold value $\alpha$ to be the group exhibiting periodicity. If there are more than one group of which the access counts exceed the threshold value $\alpha$, the predicting unit 19b judges whether there is only one group of which the access counts exceed the threshold value $\alpha$, among the groups obtained by the obtaining unit 19a by dividing each of the offset values by 2N and repeats the same process. In other words, the predicting unit 19b determines that periodicity is observed if there is only one group of which the access counts exceed the threshold value $\alpha$ and identifies the value by which each of the offset values was divided to be the periodical cycle.

Figure 8A:
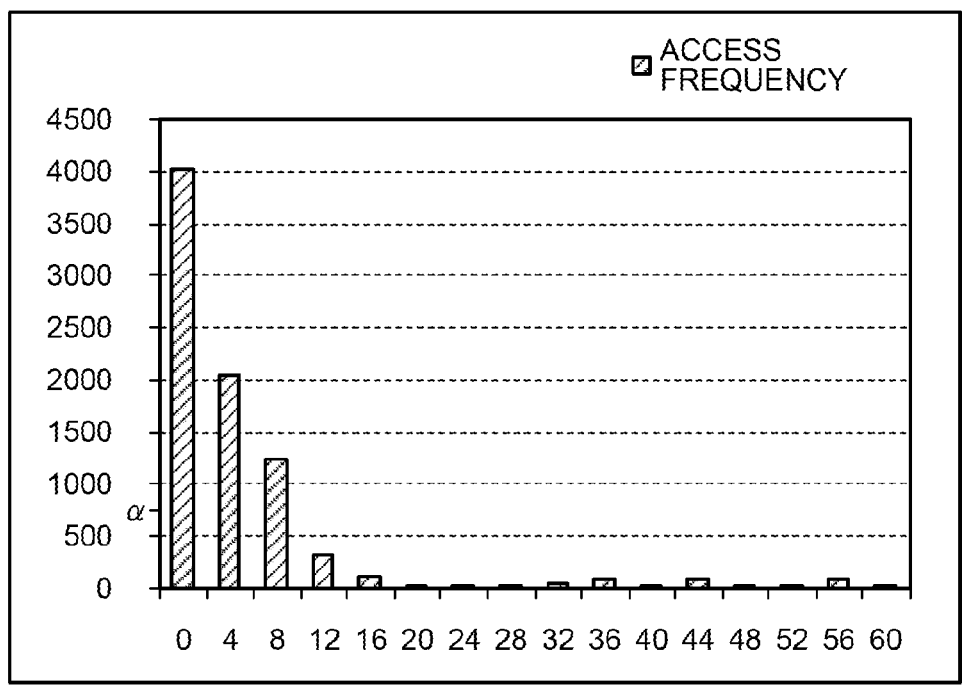
FIG. 8A is a drawing for explaining a process performed by a managing server according to the present embodiment.
Figure 8B:
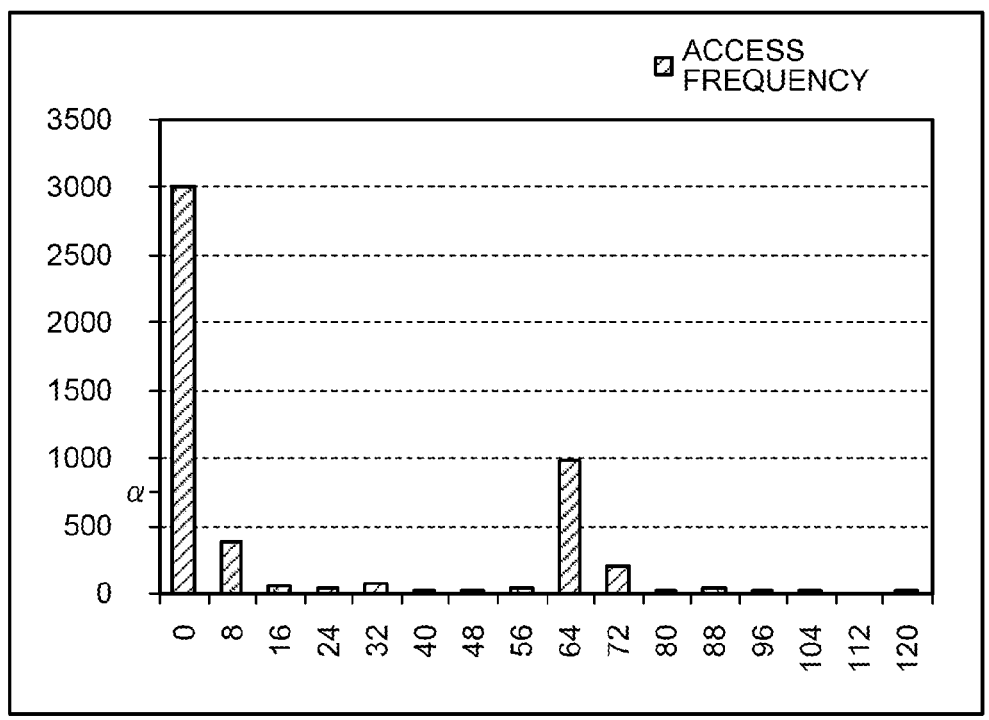
FIG. 8B is another drawing for explaining the process performed by the managing server according to the present embodiment.

FIGS. 8A and 8B are drawings for explaining a process performed by the managing server 4 according to the present embodiment. The example in FIG. 8A is a chart representation of the registered contents of the seventh table 18e in the example in FIG. 7A. In the example in FIG. 8A, the horizontal axis expresses offset ranges, whereas the vertical axis expresses access counts. In the example in FIG. 8A, there are three consecutive groups of which the access counts exceed the threshold value $\alpha$, and it is not that there is only one group of which the access counts exceed the threshold value $\alpha$. Thus, the predicting unit 19b determines that no periodicity is observed in the registered contents of the seventh table 18e. The example in FIG. 8B is a chart representation of the registered contents of the seventh table 18e in the example in FIG. 7B. In the example in FIG. 8B, the horizontal axis expresses offset ranges, whereas the vertical axis expresses access counts. In the example in FIG. 8B, there are two groups of which the access counts exceed the threshold value $\alpha$, and it is not that there is only one group of which the access counts exceed the threshold value $\alpha$. Thus, the predicting unit 19b determines that no periodicity is observed in the registered contents of the seventh table 18e. After that, the predicting unit 19b eventually identifies "64 M" to be the periodical cycle.

Further, the predicting unit 19b stores the group exhibiting periodicity and periodicity information (not depicted) indicating an access pattern such as the periodical cycle into the storage unit 18. The periodicity information will be compared with an access pattern exhibited by the seventh table 18e that is generated by the obtaining unit 19a after the periodicity information is generated.

Access patterns of file systems have certain characteristics. For example, the entirety of a disk region is sectioned into smaller regions that have a predetermined size and are called "block groups". Further, the frequency of accesses to the data positioned at the head of each of the block groups may be higher than the access frequency of the other parts of the disk. For this reason, as explained above, the predicting unit 19b identifies the head of each of such block groups. The group exhibiting periodicity identified by the predicting unit 19b in this manner represents the heads of the blocks in the disk having higher access frequency than the other parts of the disk. Thus, the predicting unit 19b is able to identify and predict the offsets having higher access frequency.

The transmission controlling unit 19c is configured, when the predicting unit 19b has identified the time period of which the access count exceeds the threshold value R from among the time periods that are repeated in the predetermined cycles, to refer to the sixth table 18d and to perform the following process during the time periods that are repeated thereafter in predetermined cycles: The transmission controlling unit 19c exercises control so that the data in the first volume 20a indicated by the corresponding offset is transmitted to a VM by using the corresponding IP address, prior to the time period of which the access count exceeds the threshold value R and which was identified by the predicting unit 19b. In the present embodiment, the time period identified by the predicting unit 19b is a time period that is repeated every 24 hours or every week. Further, the transmission controlling unit 19c controls the first volume 20a so as to transmit the data stored in the first volume 20a to at least one of the plurality of VMs, prior to the predicted time period.

For example, the transmission controlling unit 19c obtains a current time and a current day of the week. After that, by referring to the sixth table 18d, the transmission controlling unit 19c searches for a record that has registered therein the same day of the week as the current day of the week and that has registered therein a time period later by a predetermined length of time than the current time. For example, in the example in FIG. 6, if the current time is 7 o'clock and the current day of the week is Wednesday, the transmission controlling unit 19c obtains the first record as a result of the search. If a record is obtained as a result of the search, the transmission controlling unit 19c refers to the third table 18a and judges whether the access count of the current time is equal to or lower than a threshold value. For example, in the example in FIG. 3, the transmission controlling unit 19c judges whether the access count of the time period from 7 o'clock to 8 o'clock is equal to or lower than the threshold value. In this situation, the transmission controlling unit 19c is able to judge whether a sum of all the access counts in the time period from 7 o'clock to 8 o'clock is equal to or lower than the threshold value. Further, the transmission controlling unit 19c is also able to judge whether, among the access counts in the time period from 7 o'clock to 8 o'clock, the access count corresponding to the offset range registered in the record is equal to or lower than the threshold value. Further, if the access count is equal to or lower than the threshold value, the transmission controlling unit 19c identifies a subnet by applying a subnet mask to all the IP addresses registered in the record. Subsequently, the transmission controlling unit 19c identifies one VM serving as a transmission destination for each of the subnets. After that, the transmission controlling unit 19c transfers the data in the first volume 20a indicated by the offset range registered in the record, to the one VM identified for each of the subnets. In addition, the transmission controlling unit 19c transmits an instruction to the one VM identified for each of the subnets, so as to indicate that the data is to be transferred to the other VMs that are present in the same subnet and are indicated by the IP addresses registered in the record. After that, the transmission controlling unit 19c determines, for each of the subnets, the number of VMs to which data is to be transmitted next time, on the basis of the I/O load on the managing server 4 that is observed when the data is transmitted to the VMs this time. For example, if the I/O load is smaller than a predetermined threshold value, the transmission controlling unit 19c determines that the number of VMs in each subnet to which the data is to be transmitted next time is to be increased by a predetermined value (e.g., by 1). On the contrary, if the I/O load is larger than the predetermined threshold value, the transmission controlling unit 19c determines that the number of VMs in each subnet to which the data is to be transmitted next time is to be decreased by the predetermined value (e.g., by 1). When transmitting the data next time, the transmission controlling unit 19c transmits the data and an instruction to transfer the data, to the number of VMs determined in this manner.

As explained above, the managing server 4 according to the present embodiment is configured so that the frequency of accesses from the plurality of VMs to the first volume 20a is obtained for each of the time periods, the first volume 20a being accessed by the plurality of VMs. On the basis of the obtained access counts of the plurality of VMs for each of the time periods, the managing server 4 according to the present embodiment is configured so that the time period of which the access count exceeds the threshold value is identified from among the time periods that are repeated in cycles such as every week. The managing server 4 according to the present embodiment is configured to exercise control so that, by referring to the sixth table 18d, the data in the first volume 20a indicated by the corresponding offset is transmitted to the VMs, prior to the identified time period of which the access count exceeds the threshold value R, during the time period that is repeated in cycles such as every week. Consequently, because the managing server 4 according to the present embodiment is configured so that the data is transmitted to the VMs prior to the time period during which the access count becomes high, it is possible to reduce the I/O load on the storage server 5.

Further, the managing server 4 according to the present embodiment is configured so that, during the time period that is repeated in the predetermined cycles, the data is transmitted to the VMs during such a time period that is prior to the time period of which the access count exceeds the threshold value R and that has an access count equal to or lower than the threshold value. As a result, the VMs receive the data and store the received data into the second volume. Consequently, because the managing server 4 according to the present embodiment is configured so that the data is transmitted to the VMs while the access amount to the storage server 5 is equal to or smaller than the threshold value, it is possible to reduce the I/O load on the storage server 5.

Further, the managing server 4 according to the present embodiment is configured so that the instruction is transmitted to the one VM identified for each of the subnets, so as to indicate that the data is to be transferred to the other VMs in the subnet. Thus, because the managing server 4 according to the present embodiment is able to reduce the data communication amount between the storage server 5 and the VMs, it is possible to reduce the I/O load on the storage server 5.

Further, by referring to the newly-generated seventh table 18e, the transmission controlling unit 19c judges whether the access pattern of the seventh table 18e matches the access pattern indicated by the periodicity information described above. If the access patterns match, the transmission controlling unit 19c transfers the data in the first volume 20a indicated by the offset corresponding to the group identified by the predicting unit 19b as exhibiting periodicity, to the VMs. In this situation, the transmission controlling unit 19c does not transmit the data to all the transmission-target VMs. By using the method described above, the transmission controlling unit 19c identifies the subnets by applying the subnet mask to all the IP addresses registered in the record. Subsequently, the transmission controlling unit 19c identifies one VM to as a transmission destination, for each of the subnets. After that, the transmission controlling unit 19c transmits the data in the first volume 20a indicated by the offset corresponding to the group identified by the predicting unit 19b as exhibiting periodicity, to the one VM identified for each of the subnets. In addition, the transmission controlling unit 19c transmits an instruction to the one VM identified for each of the subnets so as to indicate that the data is to be transferred to the other VMs that are present in the same subnet and are indicated by the IP addresses registered in the record. Subsequently, by using the method described above, the transmission controlling unit 19c determines, for each of the subnets, the number of VMs to which data is to be transmitted next time, on the basis of the I/O load on the managing server 4 that is observed when the data is transmitted to the VMs this time.

As explained above, because the managing server 4 according to the present embodiment is configured so that the data stored at the head of each of the blocks in the disk having higher access frequency than the other parts of the disk is transmitted to the VMs before the access load becomes large, it is possible to reduce the I/O load.

In this situation, when the OS program stored in the first volume 20a is updated, if the managing server 4 informed all the target VMs (i.e., all the VMs having the data of the pre-update OS program) of the update fact, a large load would be imposed on the entirety of the system 1. To cope with this situation, when the OS program stored in the first volume 20a is updated, the transmission controlling unit 19c transmits the update fact to one target VM that is identified for each of the subnets and transmits an instruction indicating that a transfer is to be made to the other target VMs that are present in the same subnet, in the same manner as described above. For example, the transmission controlling unit 19c refers to a table (not depicted) indicating the registered contents of the second volume of each of the VMs and identifies such VMs that have the data of the pre-update OS program stored in the second volume thereof. After that, in the same manner as described above, the transmission controlling unit 19c identifies one VM serving as a transmission destination for each of the subnets. The transmission controlling unit 19c then transmits the update fact to the one target VM identified for each of the subnets and transmits the instruction indicating that the transfer is to be made to the other target VMs that are present in the same subnet. As a result, compared to the situation where the managing server 4 informs all the target VMs of the update fact, it is possible to inform all the target VMs of the update fact, without imposing a large load on the entirety of the system 1. Further, when the OS program stored in the first volume 20a is updated, the transmission controlling unit 19c initializes corresponding sections of the third to the seventh tables 18a-18e. Each of the VMs informed of the update fact stores the update data into the second volume, as explained above, and initializes corresponding sections of the first and the second tables.

The controlling unit 19 includes an integrated circuit such as an Application Specific Integrated Circuit (ASIC) or a Field Programmable Gate Array (FPGA). The controlling unit 11 may include an electronic circuit such as a Central Processing Unit (CPU) or a Micro Processing Unit (MPU).

The storage server 5 includes a storage unit 20. The storage unit 20 stores the first volume 20a therein. The first volume 20a has registered therein data accessed by the VMs, i.e., data shared by the VMs. For example, the first volume 20a has registered therein the OS program that is shared by the VMs and that operates in each of the VMs.

Flow in the Process

Figure 9:
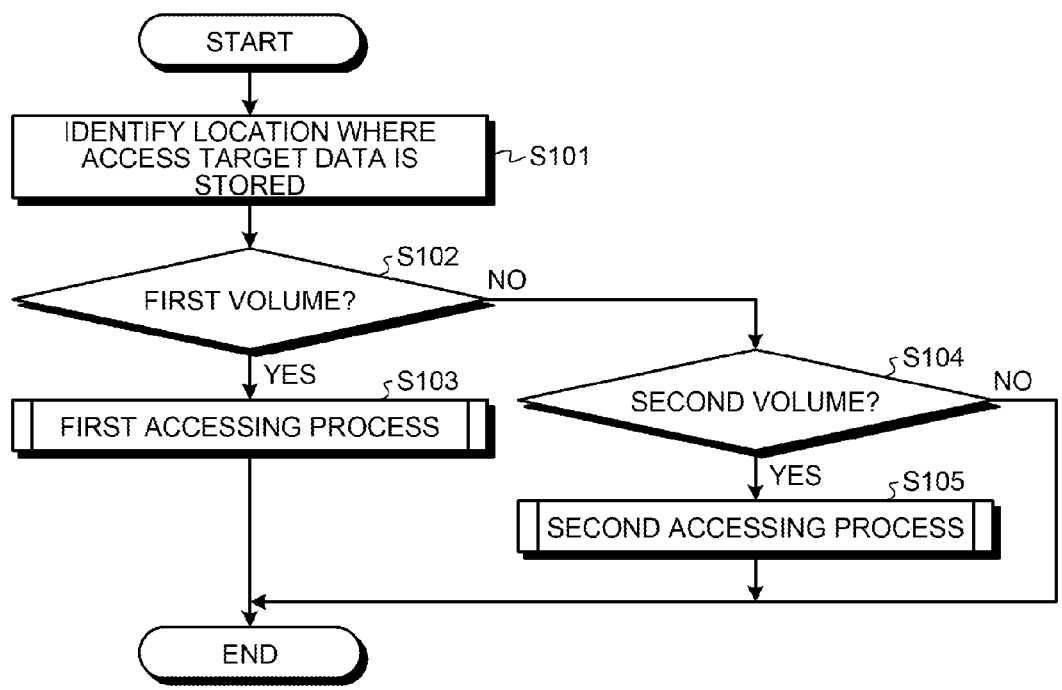
FIG. 9 is a flowchart of a procedure in a reading process according to the present embodiment.

Next, a flow in a process performed by the system 1 according to the present embodiment will be explained. With reference to FIGS. 9 to 13, a flow in a process performed by a VM according to the present embodiment will be explained. FIG. 9 is a flowchart of a procedure in a reading process according to the present embodiment. There are various possibilities for the time at which the reading process can be performed. For example, when an OS program or an application program is executed, the reading process may be performed at a time when the data is accessed.

As indicated in FIG. 9, the reading unit 11a refers to the table (not depicted) indicating the arranged locations of data and identifies the location in which the access target data is present (step S101). The reading unit 11a judges whether the access target data is present in the first volume 20a (step S102). If the access target data is present in the first volume 20a (step S102: Yes), the reading unit 11a performs a first accessing process (step S103), and the process is ended. On the contrary, if the access target data is not present in the first volume 20a (step S102: No), the reading unit 11a judges whether the access target data is present in the second volume 10c (step S104). If the access target data is present in the second volume 10c (step S104: Yes), the reading unit 11a performs a second accessing process (step S105), and the process is ended. On the contrary, if the access target data is not present in the second volume 10c (step S104: No), the process is also ended.

Figure 10:
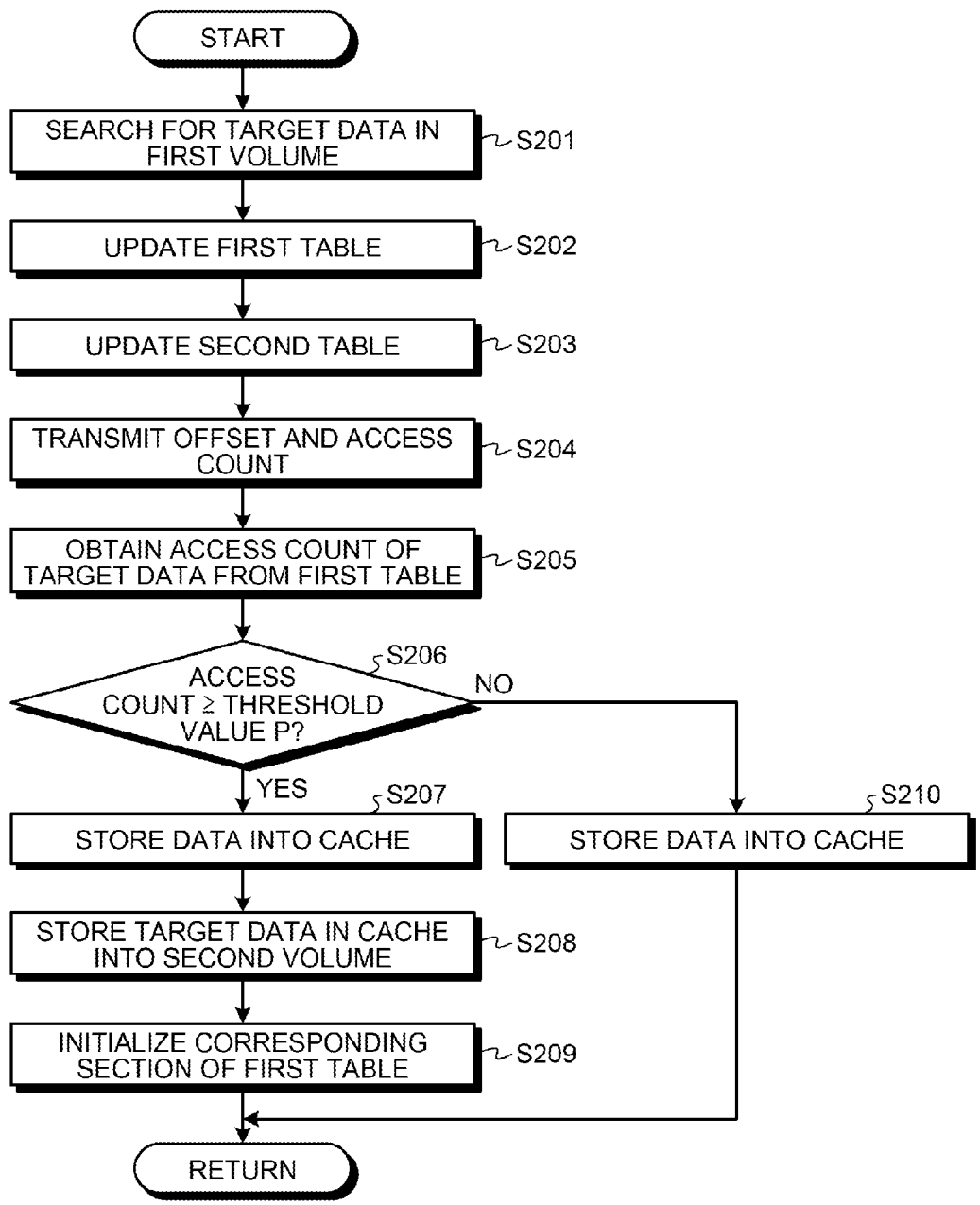
FIG. 10 is a flowchart of a procedure in a first accessing process according to the present embodiment.

FIG. 10 is a flowchart of a procedure in the first accessing process according to the present embodiment. As illustrated in FIG. 10, the reading unit 11a reads the data by accessing the first volume 20a in which the data is present and searching for the data (step S201). The updating unit 11b updates the access count and the access time in the corresponding sections of the first table 10a (step S202). The updating unit 11b updates the access count in the corresponding section of the second table 10b (step S203). The reading unit 11a transmits the offset and the access count to the managing server 4 (step S204). The storing unit 11c obtains the access count from the first table 10a (step S205). The storing unit 11c judges whether the obtained access count is equal to or higher than the predetermined threshold value P (step S206).

If the access count is equal to or higher than the predetermined threshold value P, the storing unit 11c stores the data read by the reading unit 11a into a cache (step S207). The storing unit 11c then stores the data stored in the cache into the second volume 10c (step S208). The storing unit 11c initializes the section of the first table 10a corresponding to the data stored in the second volume 10c (i.e., sets the value to 0) (step S209) and stores the processing result into the internal memory of the controlling unit 11, and the process is returned. On the contrary, if the access count is lower than the predetermined threshold value P (step S206: No), the storing unit 11c stores the data read by the reading unit 11a into a cache (step S210) and stores the processing result into the internal memory of the controlling unit 11, and the process is returned.

Figure 11:
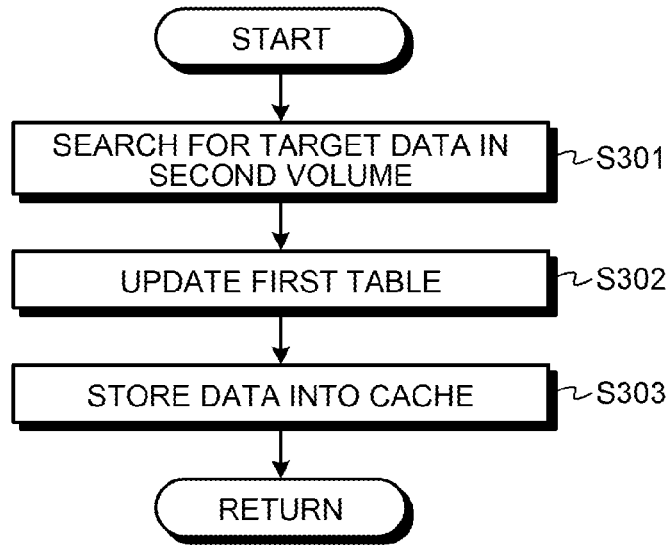
FIG. 11 is a flowchart of a procedure in a second accessing process according to the present embodiment.

FIG. 11 is a flowchart of a procedure in the second accessing process according to the present embodiment. As illustrated in FIG. 11, the reading unit 11a reads the data by accessing the second volume 10c in which the data is present and searching for the data (step S301). The updating unit 11b updates the access count and the access time in the corresponding sections of the first table 10a (step S302). The storing unit 11c stores the data read by the reading unit 11a into a cache (step S303) and stores the processing result into the internal memory of the controlling unit 11, and the process is returned.

Figure 12:
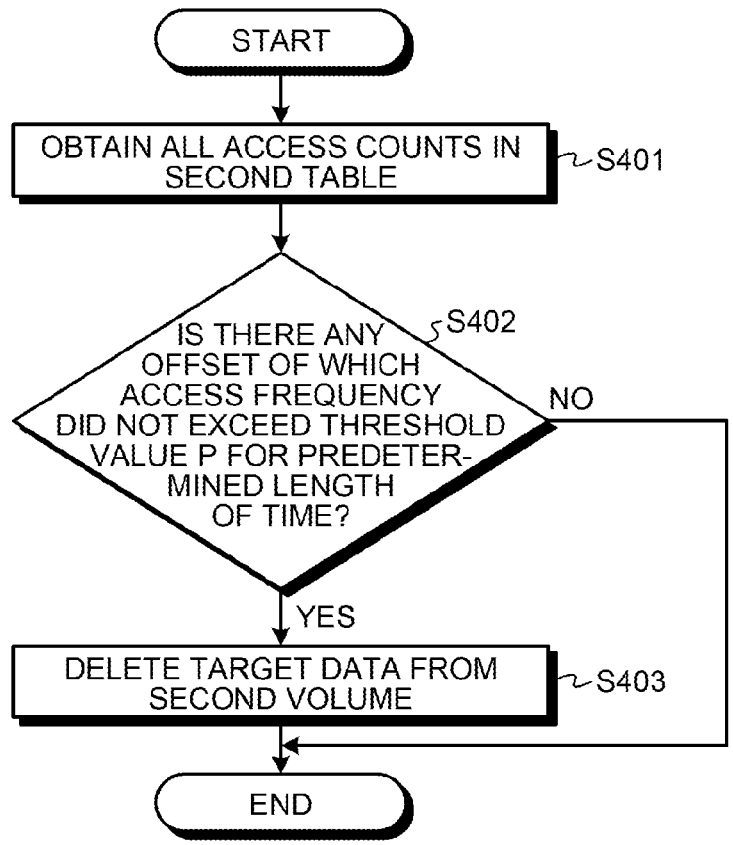
FIG. 12 is a flowchart of a procedure in a first deleting process according to the present embodiment.

FIG. 12 is a flowchart of a procedure in a first deleting process according to the present embodiment. There are various possibilities for the time at which the first deleting process can be performed. For example, the first deleting process may be performed once every predetermined length of time.

As illustrated in FIG. 12, the storing unit 11c obtains all the access counts for each of the offsets for each of the time periods, out of the second table 10b (step S401). After that, the storing unit 11c judges whether there is any offset of which the access frequency has not exceeded the threshold value P for a predetermined length of time, among the obtained access frequency values of the offsets (step S402). If there are one or more offsets of which the access frequency has not exceeded the threshold value P for the predetermined length of time (step S402: Yes), the storing unit 11c deletes the data at such offsets from the second volume 10c and updates the table indicating the arranged locations of the data (step S403), and the process is ended. On the contrary, if there is no such offset of which the access frequency has not exceeded the threshold value P for the predetermined length of time (step S402: No), the process is also ended.

Figure 13:
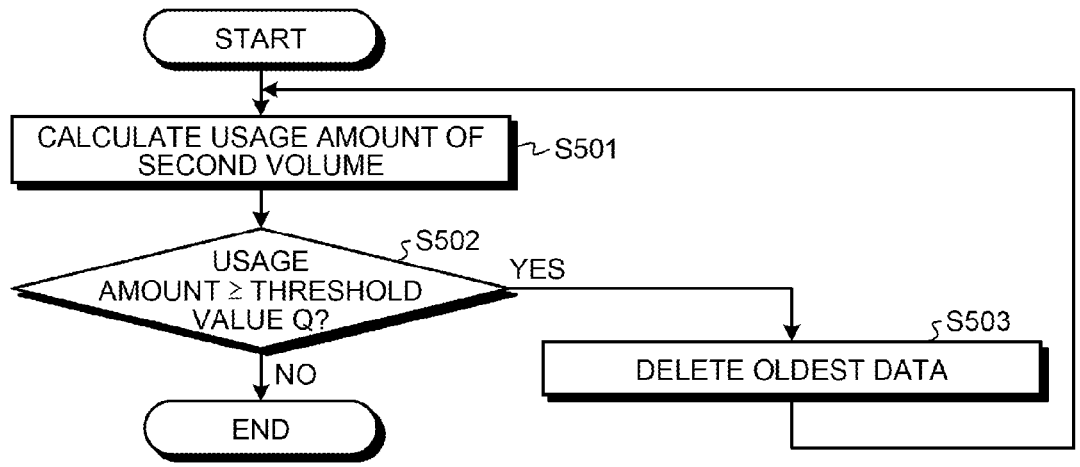
FIG. 13 is a flowchart of a procedure in a second deleting process according to the present embodiment.

FIG. 13 is a flowchart of a procedure in a second deleting process according to the present embodiment. There are various possibilities for the time at which the second deleting process can be performed. For example, the second deleting process may be performed once every predetermined length of time.

As illustrated in FIG. 13, the storing unit 11c calculates a usage amount of the second volume 10c by dividing the total size of all the pieces of data stored in the second volume 10c by the storage capacity of the second volume 10c (step S501). After that, the storing unit 11c judges whether the usage amount is equal to or larger than the threshold value Q (step S502). If the usage amount is equal to or larger than the threshold value Q (step S502: Yes), the storing unit 11c deletes the oldest data from the second volume 10c and updates the table indicating the arranged locations of the data (step S503), and the process returns to step S501. On the contrary, if the usage amount is not equal to or larger than the threshold value Q (step S502: No), the process is ended.

Figure 14:
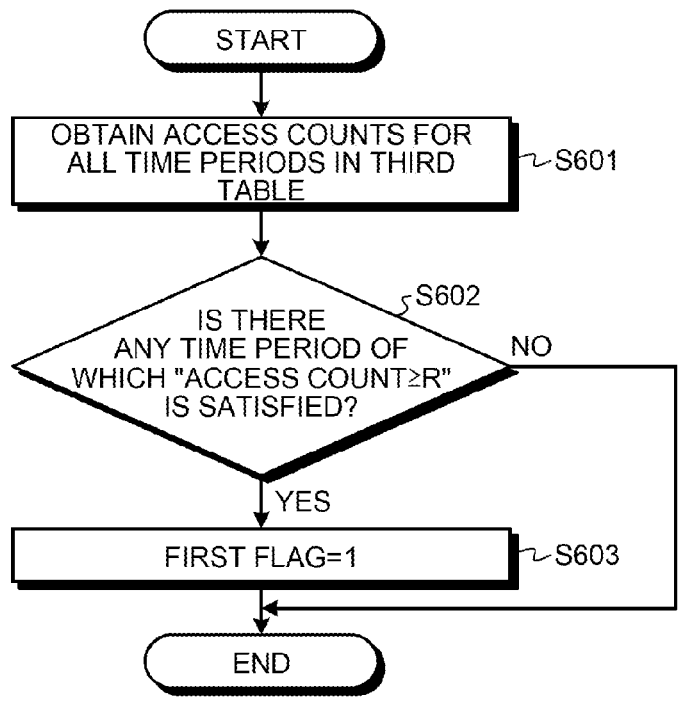
FIG. 14 is a flowchart of a procedure in a first managing process according to the present embodiment.

With reference to FIGS. 14 to 16, 18, and 19, a flow in a process performed by the managing server 4 according to the present embodiment will be explained. FIG. 14 is a flowchart of a procedure in a first managing process performed by the predicting unit 19b according to the present embodiment. There are various possibilities for the time at which the first managing process can be performed. For example, the first managing process may be performed at predetermined time intervals.

As illustrated in FIG. 14, the predicting unit 19b obtains all the access counts for all the time periods and all the offset ranges registered in the third table 18a (step S601). From among all the access counts obtained, the predicting unit 19b judges whether there are a time period and an offset range of which the access count exceeds the threshold value R (step S602). If there are a time period and an offset range of which the access count exceeds the threshold value (step S602: Yes), the predicting unit 19b identifies such a time period and an offset range of which the access count exceeds the threshold value R, stores the identified time period and offset range into the internal memory, turning on the first flag by setting the first flag to a predetermined value (e.g., "1"), so as to indicate that there is at least one access count exceeding the threshold value R (step S603), and the process is ended. On the contrary, if there is no time period and no offset range of which the access count exceeds the threshold value R (step S602: No), the process is ended.

Figure 15:
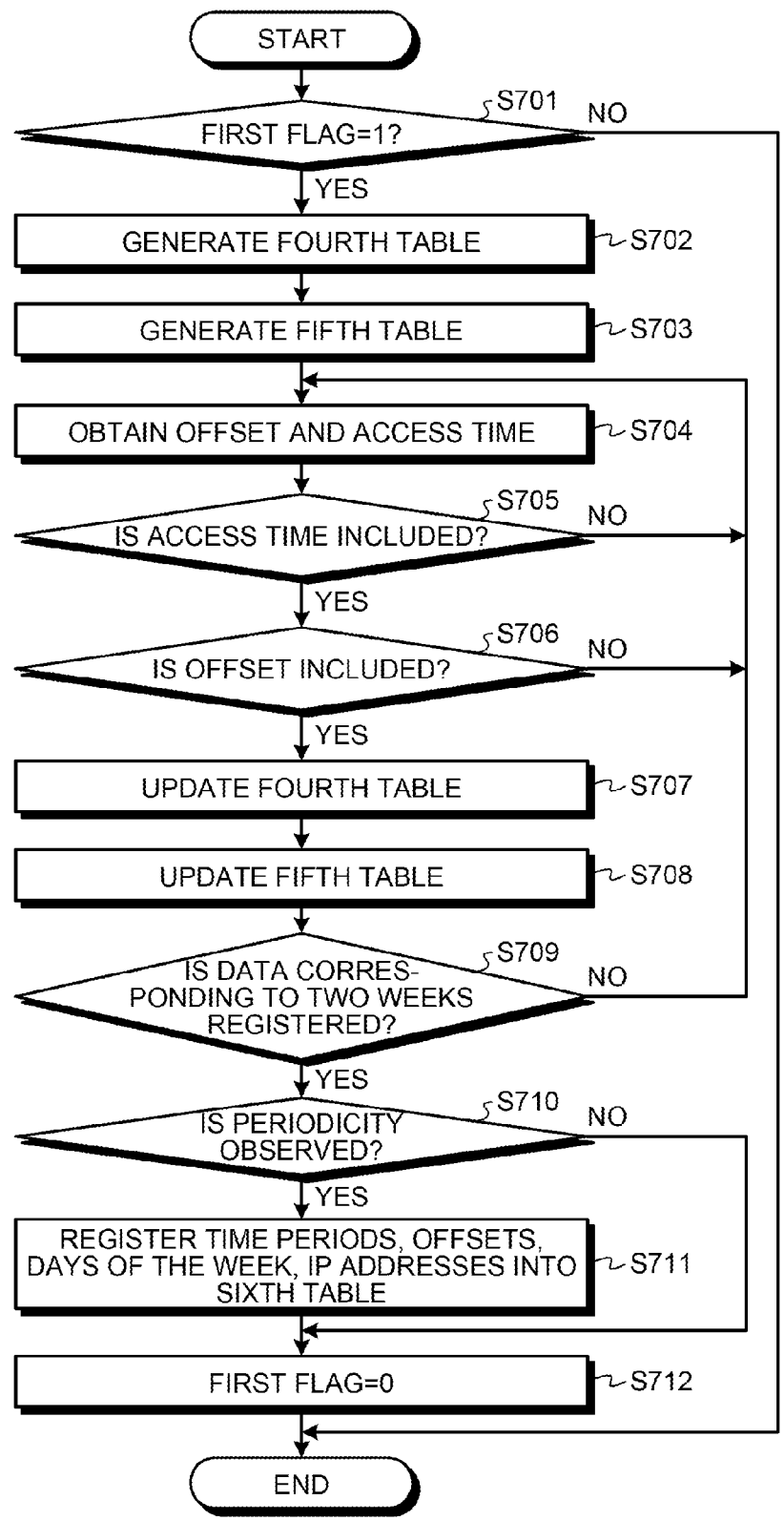
FIG. 15 is a flowchart of a procedure in a second managing process according to the present embodiment.

FIG. 15 is a flowchart of a procedure in a second managing process performed by the obtaining unit 19a according to the present embodiment. There are various possibilities for the time at which the second managing process can be performed. For example, the second managing process may be performed at predetermined time intervals, e.g., once every thirty minutes or at the time "0:00" every day. The time intervals at which the second managing process is performed may be arranged to be shorter than the time intervals at which the first managing process is performed.

As illustrated in FIG. 15, the obtaining unit 19a judges whether the value of the first flag is set to "1" (step S701). If the value of the first flag is not "1" (step S701: No), the process is ended. On the contrary, if the value of the first flag is "1" (step S701: Yes), the obtaining unit 19a generates the fourth table 18b (step S702). The obtaining unit 19a generates the fifth table 18c (step S703). The obtaining unit 19a obtains an offset and an access time from a VM (step S704). The obtaining unit 19a judges whether the access time is included in the time period that was identified by the predicting unit 19b and is stored in the internal memory (step S705). If the access time is not included in the time period that was identified by the predicting unit 19b and is stored in the internal memory (step S705: No), the process returns to step S704.

On the contrary, if the access time is included in the time period that was identified and is stored in the internal memory (step S705: Yes), the obtaining unit 19a judges whether the obtained offset is included in the offset range that was identified by the predicting unit 19b and is stored in the internal memory (step S706). If the obtained offset is not included in the offset range that was identified by the predicting unit 19b and is stored in the internal memory (step S706: No), the process returns to step S704. On the contrary, if the obtained offset is included in the offset range that was identified by the predicting unit 19b and is stored in the internal memory (step S706: Yes), the obtaining unit 19a increments, by 1, the value of the access count stored in a corresponding section of the fourth table 18b (step S707). The obtaining unit 19a registers the IP address into a corresponding section of the fifth table 18c (step S708). The obtaining unit 19a registers data corresponding to a predetermined length of time into the fourth table 18b. The obtaining unit 19a judges whether data corresponding to two weeks have been registered in the fourth table 18b and a copy of the fourth table 18b (step S709). For example, by judging whether the storage unit 18 has stored therein two sets of data for Monday through Sunday, the obtaining unit 19a is able to judge whether data corresponding to two weeks has been registered in the fourth table 18b and the copy of the fourth table 18b. If two-week data has not been registered (step S709: No), the process returns to step S704.

On the contrary, if two-week data has been registered (step S709: Yes), the predicting unit 19b judges, for each of the offset ranges, periodicity is observed in the time periods of which the access count exceeds the threshold value R (step S710). If periodicity is observed (step S710: Yes), the obtaining unit 19a generates the sixth table 18d registering therein the time periods determined to exhibit periodicity, the offset ranges of which the access count exceeds the threshold value, the days of the week, and the IP addresses of the VMs (step S711). After that, the process proceeds to step S712 (explained later). On the contrary, if no periodicity is observed (step S710: No), the obtaining unit 19a sets the value of the first flag to "0" (step S712), and the process is ended.

Figure 16:
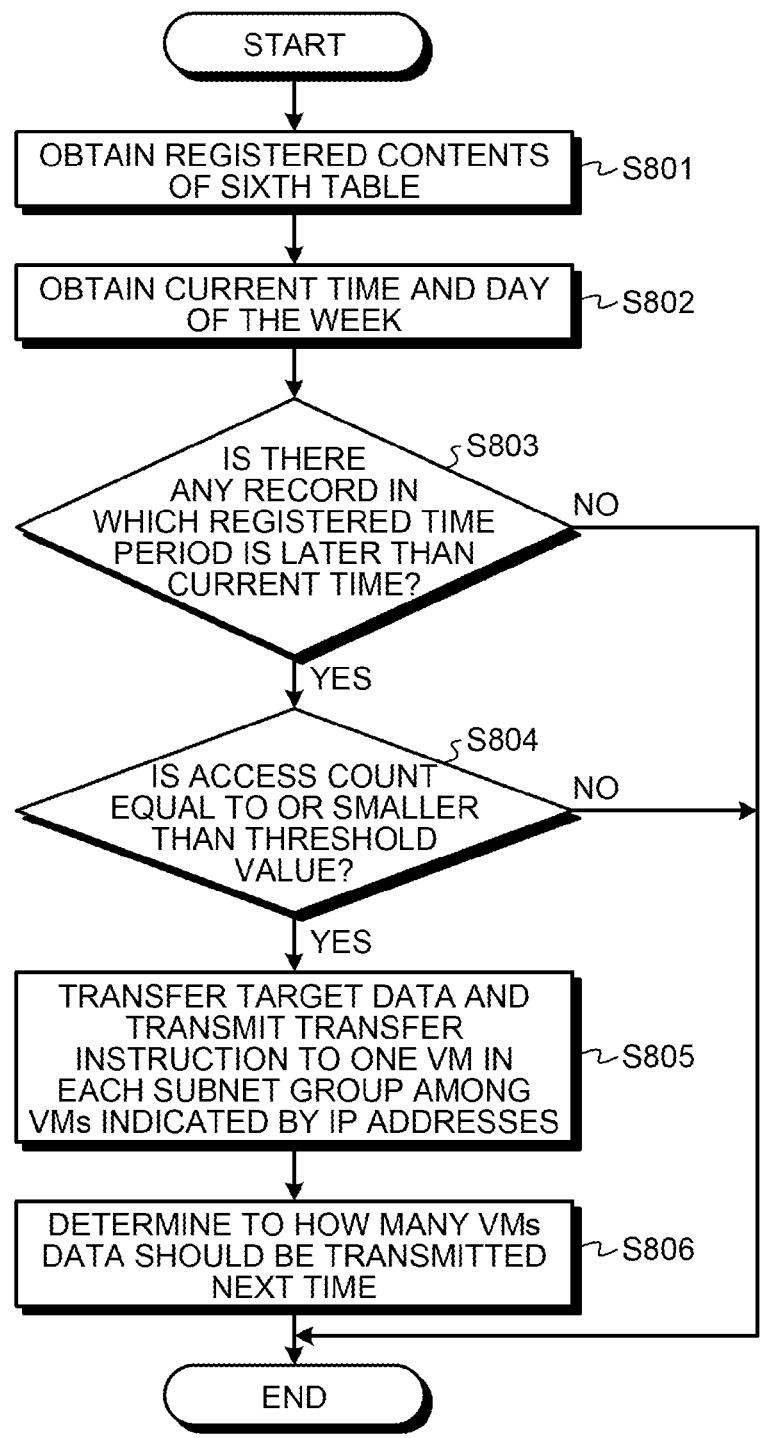
FIG. 16 is a flowchart of a procedure in a third managing process according to the present embodiment.

FIG. 16 is a flowchart of a procedure in a third managing process performed by the transmission controlling unit 19c according to the present embodiment. There are various possibilities for the time at which the third managing process can be performed. The third managing process may be performed when the sixth table 18d is generated, for example, when the sixth table 18d is generated at the time "0:00" every day.

As illustrated in FIG. 16, the transmission controlling unit 19c obtains the registered contents of the sixth table 18d (step S801). The transmission controlling unit 19c obtains the current time and the current days of the week (step S802). From among the records registered in the sixth table 18d, the transmission controlling unit 19c searches for a record that has registered therein the same day of the week as the current day of the week and that has registered therein a time period later by a predetermined length of time than the current time (step S803). If no record is obtained from the search (step S803: No), the process is ended. If one or more records are obtained from the search (step S803: Yes), the transmission controlling unit 19c refers to the third table 18a and judges whether the access count of the current time is equal to or lower than the threshold value (step S804). If the access count is equal to or lower than the threshold value (step S804: Yes), the transmission controlling unit 19c transfers the data in the first volume 20a indicated by the offset range registered in the record, to one VM that is identified for each of the subnets. In addition, the transmission controlling unit 19c transmits an instruction to the one VM identified for each of the subnets, so as to indicate that the data is to be transferred to the other VMs that are present in the same subnet (step S805). After that, the transmission controlling unit 19c determines, for each of the subnets, the number of VMs to which data is to be transmitted next time, on the basis of the I/O load on the managing server 4 that is observed when the data is transmitted to the VMs this time (step S806), and the process is ended.

Figure 17:
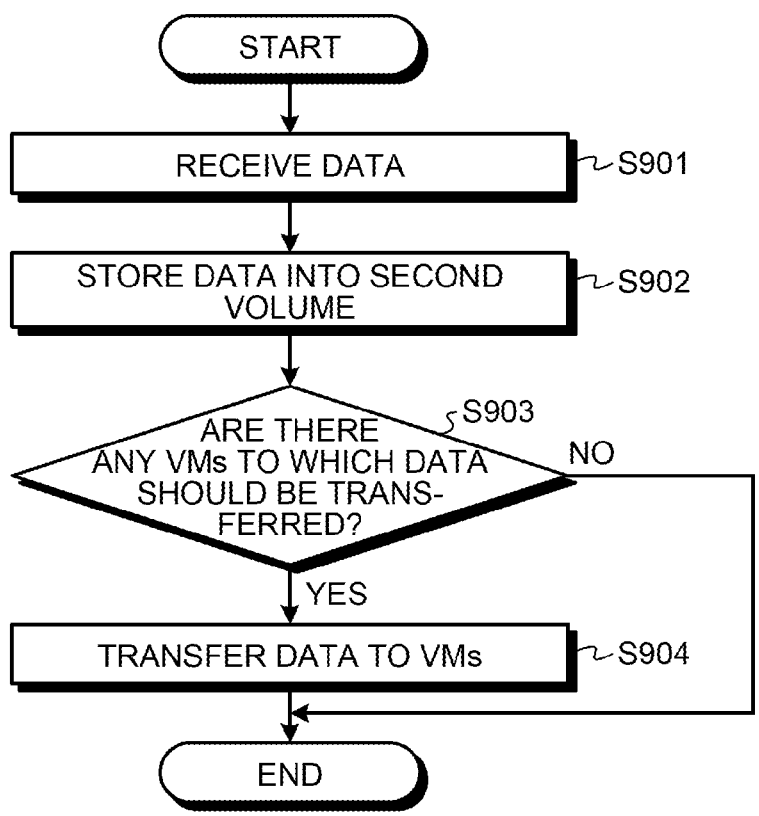
FIG. 17 is a flowchart of a procedure in a storing process according to the present embodiment.

With reference to FIG. 17, a flow in a process performed by each of the VMs according to the present embodiment will be explained. FIG. 7 is a flowchart of a procedure in a storing process according to the present embodiment. There are various possibilities for the time at which the storing process can be performed. For example, the storing process may be performed when data is transmitted from the managing server 4 to the VM.

As illustrated in FIG. 17, the storing unit 11c receives data transmitted from the managing server 4 (step S901). If a data transfer instruction is transmitted from the managing server 4 to the VM, the storing unit 11c also receives the data transfer instruction. After that, the storing unit 11c stores the data into the second volume 10c (step S902). The storing unit 11c judges whether a data transfer instruction was received (step S903). If no data transfer instruction was received (step S903: No), the process is ended. On the contrary, if a data transfer instruction was received (step S903: Yes), the storing unit 11c transfers the data to the VMs indicated by the instruction (step S904), and the process is ended.

Figure 18:
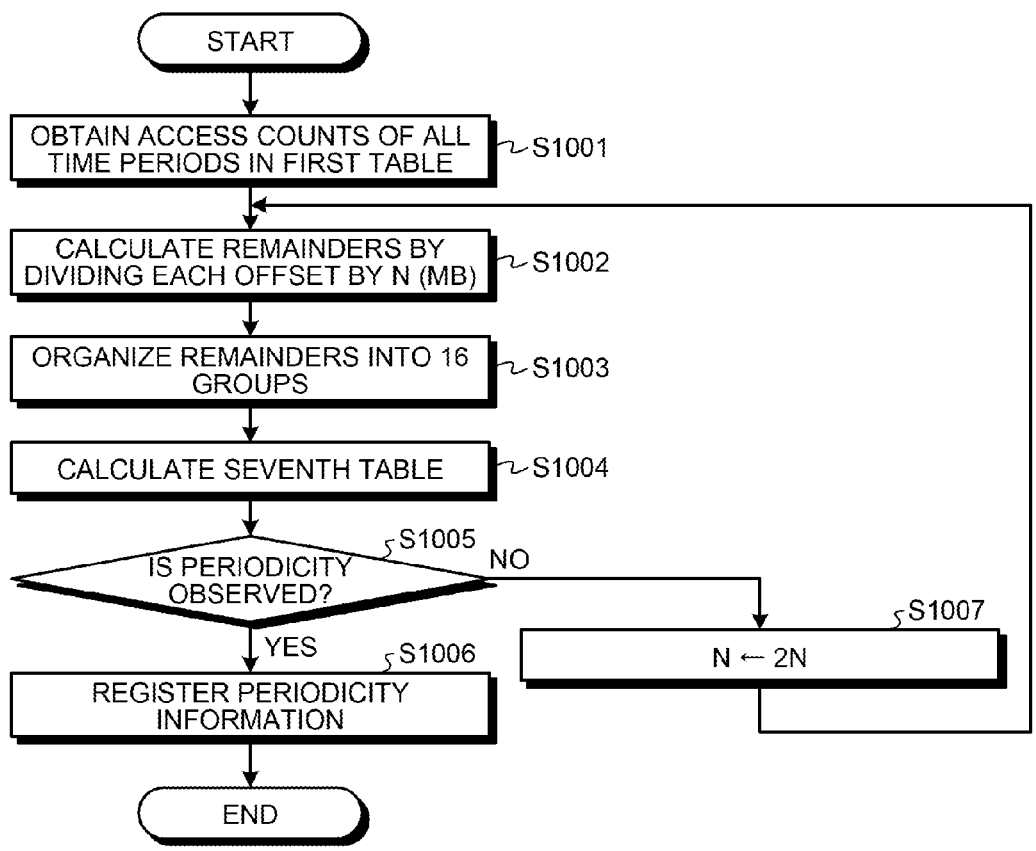
FIG. 18 is a flowchart of a procedure in a fourth managing process according to the present embodiment.

FIG. 18 is a flowchart of a procedure in a fourth managing process performed by the obtaining unit 19a and the predicting unit 19b according to the present embodiment. There are various possibilities for the time at which the fourth managing process can be performed. For example, the fourth managing process may be performed when a predetermined length of time (e.g., 3 hours) has elapsed since the system 1 started operating.

As illustrated in FIG. 18, the obtaining unit 19a obtains the registered contents of the first table from all the VMs (step S1001). The obtaining unit 19a calculates, for each of the offsets, a sum of the access counts indicated in the obtained registered contents of the first tables of all the VMs and calculates a remainder by dividing each of the offset values by N (step S1002). The obtaining unit 19a organizes the calculated remainders into sixteen groups (step S1003). The obtaining unit 19a generates the seventh table 18e registering therein the groups and the access counts that are kept in correspondence with one another (step S1004).

The predicting unit 19b judges whether periodicity is observed in the registered contents of the seventh table 18e (step S1005). If no periodicity is observed in the registered contents of the seventh table 18e (step S1005: No), the predicting unit 19b doubles the value of N (step S1007), and the process returns to step S1002. On the contrary, if periodicity is observed in the registered contents of the seventh table 18e (step S1005: Yes), the obtaining unit 19a stores periodicity information into the storage unit 18 (step S1006), and the process is ended.

Figure 19:
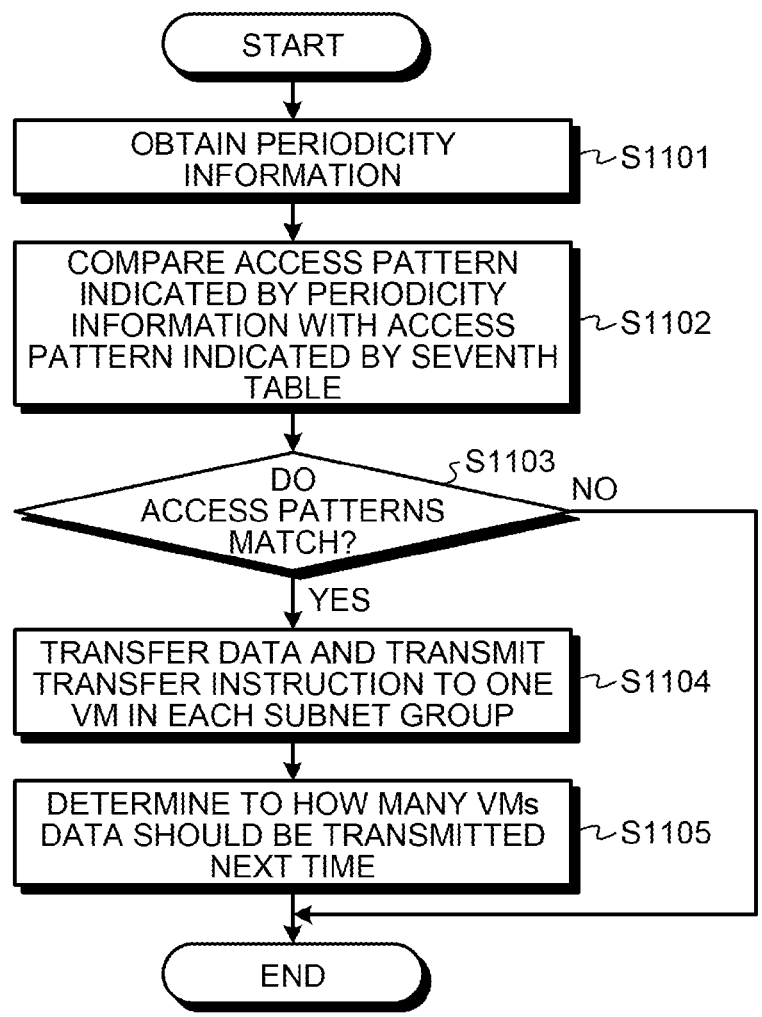
FIG. 19 is a flowchart of a procedure in a fifth managing process according to the present embodiment.

FIG. 19 is a flowchart of a procedure in a fifth managing process according to the present embodiment. There are various possibilities for the time at which the fifth managing process can be performed. For example, the fifth managing process may be performed once every predetermined length of time (e.g., once every three hours), after the periodicity information is stored in the storage unit 18.

As illustrated in FIG. 19, the transmission controlling unit 19c obtains the periodicity information stored in the storage unit 18 from the storage unit 18 (step S1101). The transmission controlling unit 19c compares the access pattern indicated by the obtained periodicity information with the access pattern indicated by the registered contents of the newly-generated seventh table 18e (step S1102). The transmission controlling unit 19c judges whether the access patterns match, as a result of the comparison (step S1103). If the access patterns match, as a result of the comparison (step S1103: Yes), the transmission controlling unit 19c performs the following process: The transmission controlling unit 19c transfers the data in the first volume 20a indicated by the offset corresponding to the periodical group that was identified by the predicting unit 19b and is stored in the internal memory, to one VM identified for each of the subnets. In addition, the transmission controlling unit 19c transmits an instruction to the one VM identified for each of the subnets, so as to indicate that the data is to be transferred to the other VMs that are present in the same subnet and are indicated by the IP addresses registered in the record (step S1104). Subsequently, the transmission controlling unit 19c determines, for each of the subnets, the number of VMs to which data is to be transmitted next time, on the basis of the I/O load on the managing server 4 that is observed when the data is transmitted to the VMs this time (step S1105), and the process is ended. On the contrary, if the access patterns do not match, as a result of the comparison (step S1103: No), the process is also ended.

As explained above, the managing server 4 according to the present embodiment is configured so that the frequency of accesses from the plurality of VMs to the first volume 20a is obtained for each of the time periods, the first volume 20a being accessed by the plurality of VMs. On the basis of the obtained access counts of the plurality of VMs for each of the time periods, the managing server 4 according to the present embodiment is configured so that the time period of which the access count exceeds the threshold value is identified from among the time periods that are repeated in cycles such as every week. The managing server 4 according to the present embodiment is configured to exercise control so that, by referring to the sixth table 18d, the data in the first volume 20a indicated by the corresponding offset is transmitted to the VMs, prior to the identified time period of which the access count exceeds the threshold value R, during the time period that is repeated in cycles such as every week. Consequently, because the managing server 4 according to the present embodiment is configured so that the data is transmitted to the VMs prior to the time period during which the access count becomes high, it is possible to reduce the I/O load on the storage server 5.

Further, the managing server 4 according to the present embodiment is configured so that the time period of which the frequency of accesses from the plurality of VMs to the first volume 20a storing the data therein will exceed the predetermined threshold value is predicted, on the basis of the status of the accesses from the plurality of VMs to the first volume 20a. Further, the managing server 4 according to the present embodiment is configured so that the first volume 20a is controlled so as to transmit the data stored therein to at least one of the plurality of VMs, prior to the predicted time period. Consequently, because the managing server 4 according to the present embodiment is configured so that the data is transmitted to the VMs prior to the time period during which the access count becomes high, it is possible to reduce the I/O load on the storage server 5.

Further, the managing server 4 according to the present embodiment is configured so that, for each of the offsets, the frequency of accesses from the plurality of VMs to the first volume 20a is obtained, the first volume 20a being accessed by the plurality of VMs. On the basis of the obtained access counts of the plurality of VMs for each of the offsets, the managing server 4 according to the present embodiment is configured so that the plurality of offsets of which the access count exceeds the threshold value and which exhibit periodicity are identified. The managing server 4 according to the present embodiment is configured to exercise control so that the data stored in the first volume 20a indicated by the identified offsets is transmitted to the VMs. Consequently, because the managing server 4 according to the present embodiment is configured so that the data stored at the head of each of the blocks in the disk having higher access frequency than other parts of the disk is transmitted to the VMs before the access loads become large, it is possible to reduce the I/O load.

Further, the managing server 4 according to the present embodiment is configured so that the instruction is transmitted to the one VM identified for each of the subnets, so as to indicate that the data is to be transferred to the other VMs in the subnet. Thus, because the managing server 4 according to the present embodiment is able to reduce the data communication amount between the storage server 5 and the VMs, it is possible to reduce the I/O load on the storage server 5.

Further, the managing server 4 according to the present embodiment is configured so that, for each of the subnets, the number of VMs to which data is to be transmitted next time is determined, on the basis of the I/O load on the managing server 4 that is observed when the data is transmitted to the VMs this time. Consequently, the managing server 4 according to the present embodiment is able to transmit data to an appropriate number of VMs.

The managing server 4 according to the present embodiment is configured so that, during the time period that is repeated in the predetermined cycles, the data is transmitted to the VMs during such a time period that is prior to the time period of which the access count exceeds the threshold value R and that has an access count equal to or lower than the threshold value. As a result, the VMs receive the data and store the received data into the second volume. Consequently, because the managing server 4 according to the present embodiment is configured so that the data is transmitted to the VMs while the access amount to the storage server 5 is equal to or smaller than the threshold value, it is possible to reduce the I/O load on the storage server 5.

The exemplary embodiments of the apparatuses and the devices of the present disclosure have thus been explained. However, the present disclosure may be carried out in other various modes besides the exemplary embodiments described above. Next, other exemplary embodiments of the present disclosure will be explained.

For example, in the exemplary embodiments described above, the managing server 4 is configured so as to generate the fourth table 18b registering therein the more detailed information with respect to the offsets of which the access frequency exceeds the threshold value (i.e., the offsets having high access frequency) from the third table 18a while using all the VMs as the target. Further, in the exemplary embodiments described above, the managing server 4 is configured so as to use the fourth table 18b and to transfer the data stored at the offsets having the high access frequency to the VMs, during the time period prior to the time period of which the access frequency exceeds the threshold value. Further, in the exemplary embodiments described above, the managing server 4 is configured so as to use the fourth table 18b and to transfer the storage contents of the plurality of storage areas of which the access frequency exceeds the threshold value and of which the addresses exhibit the predetermined periodicity, to the VMs. However, the apparatuses and the devices of the present disclosure are not limited to these examples. For example, each of the VMs may identify offsets of which the access frequency exceeds a threshold value out of the second table stored therein and may generate an eighth table (not depicted) that has registered therein more detailed information with respect to the identified offsets. After that, in the same manner as described above, each of the VMs may perform the following process by using the respective eighth table thereof: Each of the VMs may obtain the data stored at the offsets having high access frequency from the first volume 20a during a time period prior to the time period of which the access frequency exceeds the threshold value and store the obtained data into the second volume 10c. Further, each of the VMs may obtain, from the first volume 20a, the data stored in a plurality of storage areas of which the access frequency exceeds a threshold value and of which the addresses exhibit periodicity and may store the obtained data into the second volume 10c.

Further, in the exemplary embodiments above, the example is explained in which the table having the item "time period" expressing a duration is stored, so that the access frequency for each of the time periods is obtained, so that the obtained access frequency is registered under the item "time period" in the table, and so that the processes are performed by using the table having the access frequency registered therein. However, the apparatuses and the devices of the present disclosure are not limited to this example. For instance, each of the VMs may store therein a similar table having an item "time", so as to obtain the access frequency at each of different times, to register the obtained access frequency under the item "time" in the table, and to perform similar processes by using the table having the access frequency registered therein. In yet another example, the managing server 4 may store therein a similar table having an item "time", so as to obtain the access frequency at each of different times, to register the obtained access frequency under the item "time" in the table, and to perform similar processes by using the table having the access frequency registered therein.

Further, in the exemplary embodiments described above, the example is explained in which the transmission controlling unit 19c transfers the data to the VMs. However, the apparatuses and the devices of the present disclosure are not limited to this example. For example, the transmission controlling unit 19c may transmit an instruction to the storage server 5 so as to indicate that the data is to be transmitted to the VMs. In that situation, the storage server 5 receives the instruction and transmits the data to the VMs according to the received instruction.

Further, when a new server is to be added to the system after the system has been in operation for a predetermined length of time, by arranging the newly-added server to store therein the third table 18a in the managing server 4, it is possible to eliminate the need to start collecting the information about the access frequency from an empty state. Thus, it is possible to reduce the I/O load on the first volume 20a caused by the addition of the server.

In the exemplary embodiments described above, the example of the system in which the plurality of VMs access the first volume 20a is explained. However, the system is not limited to this example. The system may be one in which a plurality of apparatuses access a database (DB) server or the like.

Further, of the processes explained in the exemplary embodiments above, all or a part of the processes described to be performed automatically may be performed manually. Conversely, of the processes explained in the exemplary embodiments above, all or a part of the processes described to be performed manually may be performed automatically by implementing publicly-known methods.

Further, the processes performed at the steps in the processing explained in the exemplary embodiments above may arbitrarily be divided into smaller sections or be combined together, in accordance with various types of loads or the status of use. Furthermore, one or more of the steps may be omitted.

Further, the order in which the processes are performed at the steps in the processing explained in the exemplary embodiments above may arbitrarily be changed, in accordance with various types of loads and the status of use. For example, it is acceptable to perform the process at step S703 before performing the process at step S702.

Further, the constituent elements of the apparatuses and the devices illustrated in the drawings are based on functional concepts. Thus, it is not necessary to physically configure the elements as indicated in the drawings. In other words, the specific mode of distribution and integration of the apparatuses and the devices is not limited to the ones illustrated in the drawings. It is acceptable to functionally or physically distribute or integrate all or a part of the apparatuses and the devices in any arbitrary units, depending on various loads and the status of use.

Managing Program

Further, the processes performed by the managing server 4 explained in the exemplary embodiments above may be realized by causing a computer system such as a personal computer or a workstation to execute a computer program (hereinafter, a "program") prepared in advance. Next, an example of a computer that executes a managing program having the same functions as those of the managing server 4 explained in the exemplary embodiment above will be explained, with reference to FIG. 20.

Figure 20:
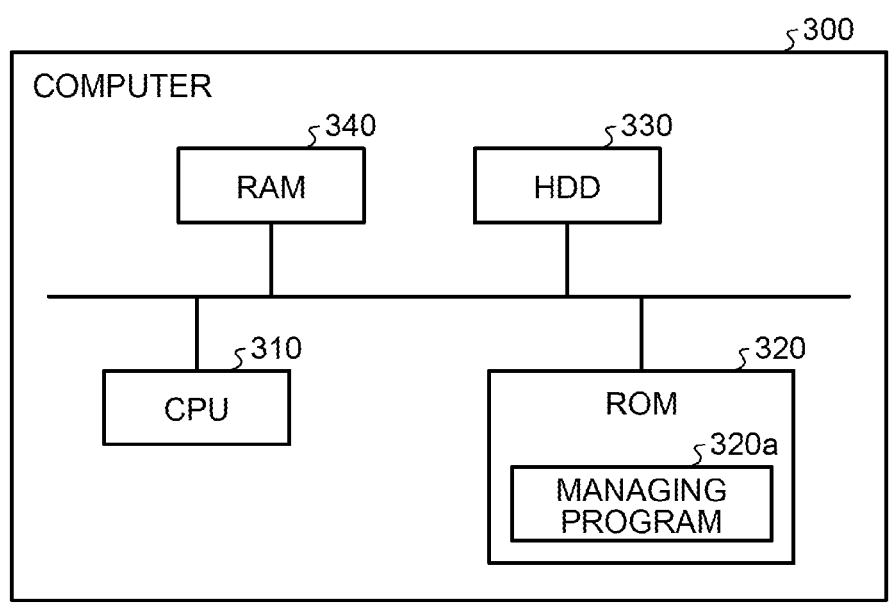
FIG. 20 is a diagram of a computer that executes a managing program.

FIG. 20 is a diagram of a computer that executes the managing program. As illustrated in FIG. 20, a computer 300 includes a Central Processing Unit (CPU) 310, a Read-Only Memory (ROM) 320, a Hard Disk Drive (HDD) 330, and a Random Access Memory (RAM) 340. The functional units 310 to 340 are connected together via a bus 350.

The ROM 320 has stored therein, in advance, a managing program 320a that achieves the same functions as those of the obtaining unit 19a, the predicting unit 19b, and the transmission controlling unit 19c described in the exemplary embodiments above. The managing program 320a may be separated, as appropriate.

Further, the CPU 310 reads the managing program 320a from the ROM 320 and executes the read managing program 320a.

Further, the HDD 330 is provided with a third table, a fourth table, a fifth table, a sixth table, and a seventh table. The third, the fourth, the fifth, the sixth, and the seventh tables correspond to the third table 18a, the fourth table 18b, the fifth table 18c, the sixth table 18d, and the seventh table 18e, respectively.

Further, the CPU 310 reads the third, the fourth, the fifth, the sixth, and the seventh tables and stores the read tables into the RAM 340. Further, by using the third, the fourth, the fifth, the sixth, and the seventh tables stored in the RAM 340, the CPU 310 executes the managing program 320a. Regarding the pieces of data stored in the RAM 340, not all the pieces of data have to be stored in the RAM 340 all the time. It is acceptable even if only the data used by each process is stored in the RAM 340.

The managing program described above does not necessarily have to be stored in the ROM from the beginning.

For example, the program may be stored in a "portable physical medium" such as a flexible disk (FD), a Compact Disk Read-Only Memory (CD-ROM), a Digital Versatile Disk (DVD), an magneto-optical disk, or an Integrated Circuit (IC) card that can be inserted into a computer. The computer then may read the program from the medium and execute the read program.

Furthermore, the program may be stored in "another computer (or a server)" that is connected to the computer via a public network, the Internet, a Local Area Network (LAN), a Wide Area Network (WAN), or the like. The computer then may read the program from the other computer and execute the read program.

According to an aspect of an embodiment, it is possible to reduce the I/O load on the storage device accessed by the plurality of apparatuses.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A managing apparatus comprising:
   a processor, wherein the processor executes a process comprising:
      predicting a time period at which frequency of accesses from a plurality of apparatuses to a storage device storing data therein will exceed a predetermined threshold value, based on a status of the accesses from the plurality of apparatuses to the storage device; and
      controlling the storage device so as to transmit the data stored therein to at least one of the plurality of apparatuses, prior to the predicted time period.

2. The managing apparatus according to claim 1, wherein based on a status of accesses from the plurality of apparatuses to each of storage areas of the storage device, the predicting predicts the time period at which the frequency of accesses will exceed the threshold value and further identifies one of the storage areas of which frequency of accesses exceeds a predetermined threshold value, and
   the controlling controls the storage device so as to transmit data stored in the identified storage area to at least one of the plurality of apparatuses prior to the predicted time period, based on the time period predicted at the predicting and the storage area identified at the predicting.

3. The managing apparatus according to claim 1, wherein the controlling controls the storage device so as to transmit the data stored therein to at least one of the plurality of apparatuses at a time which is prior to the time period predicted at the predicting and at which the frequency of accesses is equal to or lower than a threshold value.

4. The managing apparatus according to claim 1, wherein with respect to predetermined one or more of such apparatuses among the plurality of apparatuses of which the frequency of accesses to the storage device exceeds at the time period predicted at the predicting, the controlling controls the storage device so as to transmit, at a time prior to the predicted time period, the data stored therein to at least one of the plurality of apparatuses, and the controlling exercises control so that an instruction is transmitted indicating that the data is to be transferred to one or more other apparatuses among the plurality of apparatuses.

5. A computer-readable recording medium having stored therein a program for causing a computer to execute a process comprising:
   predicting a time period at which frequency of accesses from a plurality of apparatuses to a storage device storing data therein will exceed a predetermined threshold value, based on a status of the accesses from the plurality of apparatuses to the storage device; and
   controlling the storage device so as to transmit the data stored therein to at least one of the plurality of apparatuses, prior to the predicted time period.

* * * * *